(12) United States Patent
Okamura et al.

(10) Patent No.: US 11,531,199 B2
(45) Date of Patent: Dec. 20, 2022

(54) LIGHT REFLECTION DEVICE AND MOBILE OBJECT

(71) Applicants: Jumpei Okamura, Kanagawa (JP); Kenichi Yoshimura, Kanagawa (JP); Tomohiro Nakajima, Kanagawa (JP)

(72) Inventors: Jumpei Okamura, Kanagawa (JP); Kenichi Yoshimura, Kanagawa (JP); Tomohiro Nakajima, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 42 days.

(21) Appl. No.: 16/952,099

(22) Filed: Nov. 19, 2020

(65) Prior Publication Data

US 2021/0157137 A1 May 27, 2021

(30) Foreign Application Priority Data

Nov. 21, 2019 (JP) .............................. JP2019-210290
May 29, 2020 (JP) .............................. JP2020-094977

(51) Int. Cl.
*G02B 27/01* (2006.01)
*B60K 35/00* (2006.01)

(52) U.S. Cl.
CPC .......... *G02B 27/0101* (2013.01); *B60K 35/00* (2013.01); *B60K 2370/1529* (2019.05); *B60K 2370/23* (2019.05)

(58) Field of Classification Search
CPC .... G03B 21/00–64; G02B 27/01–0189; G03F 7/70825; H04N 9/31–3197
See application file for complete search history.

(56) References Cited

U.S. PATENT DOCUMENTS

| 2002/0051254 | A1 | 5/2002 | Kaneko |
| 2011/0242321 | A1 | 10/2011 | Nakajima et al. |
| 2012/0133825 | A1 | 5/2012 | Nakajima et al. |
| 2013/0016322 | A1 | 1/2013 | Wakabayashi et al. |

(Continued)

FOREIGN PATENT DOCUMENTS

| EP | 3 076 667 A1 | 10/2016 |
| JP | H08-194150 A | 7/1996 |

(Continued)

OTHER PUBLICATIONS

Extended European Search Report dated Apr. 16, 2021 in European Patent Application No. 20208328.3, 10 pages.

*Primary Examiner* — Bao-Luan Q Le
*Assistant Examiner* — Christopher A Lamb, II
(74) *Attorney, Agent, or Firm* — Xsensus LLP

(57) ABSTRACT

A light reflection device is provided with a light source configured to emit irradiation light, a reflector configured to reflect the irradiation light emitted from the light source, a housing, and a holder attached to the housing to hold the reflector. The holder is configured to restrict a movement of the reflector and allows a size of the reflector to change in contrast with the holder. A mobile object is provided with the light reflection device, a screen on which an image is formed by the irradiation light reflected by the reflector, a front windshield configured to reflect the irradiation light diverged and projected through the screen, and an imaging optical system configured to project the irradiation light emitted from the screen toward the front windshield.

20 Claims, 19 Drawing Sheets

(56) References Cited

U.S. PATENT DOCUMENTS

| | | | |
|---|---|---|---|
| 2014/0146214 A1 | 5/2014 | Nakajima et al. | |
| 2016/0290792 A1* | 10/2016 | Koike | G01B 5/0004 |
| 2017/0187996 A1* | 6/2017 | Yokoyama | H04N 9/315 |
| 2017/0255006 A1* | 9/2017 | Hou | G03B 21/145 |
| 2017/0285326 A1* | 10/2017 | Ishida | G02B 26/105 |
| 2018/0039077 A1* | 2/2018 | Kuzuhara | B60K 35/00 |
| 2019/0310462 A1 | 10/2019 | Yoshimura et al. | |

FOREIGN PATENT DOCUMENTS

| | | |
|---|---|---|
| JP | 2011-215183 | 10/2011 |
| JP | 2016-099567 | 5/2016 |
| JP | 2017-194615 A | 10/2017 |
| WO | 2011/027742 A1 | 3/2011 |

\* cited by examiner

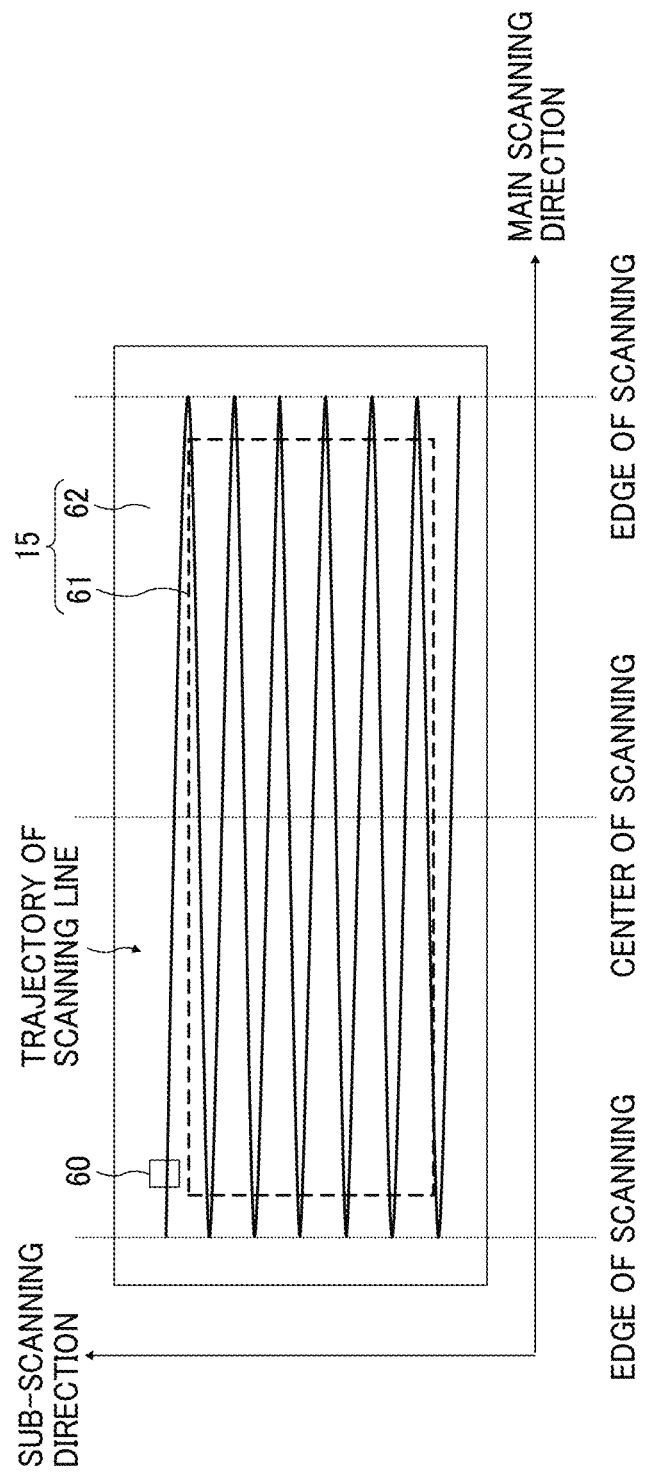

LIGHT REFLECTION DEVICE AND MOBILE OBJECT

CROSS-REFERENCE TO RELATED APPLICATIONS

This patent application is based on and claims priority pursuant to 35 U.S.C. § 119(a) to Japanese Patent Application Nos. 2019-210290 and 2020-094977, filed on Nov. 21, 2019, and May 29, 2020, respectively, in the Japan Patent Office, the entire disclosures of which are hereby incorporated by reference herein.

BACKGROUND

Technical Field

Embodiments of the present disclosure relate to alight reflection device and a mobile object.

Background Art

Currently, imaging devices are known in the art that adopt an indirect contact structure, using a fixation member, for the connection or engagement between a fixed wall and an electrical circuit board in order to prevent the relative positions of a group of optical elements and an imaging device from being changed.

Moreover, light deflectors in which adhesive of ultraviolet (UV)-curable type is used when an optical scanning device is fixed are known in the art. In such light deflectors, the optical scanning device is held and the inclination of optical scanning device with reference to a package is adjusted upon holding the package at a package holding member, and the relative positions of the optical scanning device and the package is adjusted.

SUMMARY

Embodiments of the present disclosure described herein provide a light reflection and a mobile object. The light reflection device is provided with a light source configured to emit irradiation light, a reflector configured to reflect the irradiation light emitted from the light source, a housing, and a holder attached to the housing to hold the reflector. The holder is configured to restrict a movement of the reflector and allows a size of the reflector to change in contrast with the holder. The mobile object is provided with the light reflection device, a screen on which an image is formed by the irradiation light reflected by the reflector, a front windshield configured to reflect the irradiation light diverged and projected through the screen, and an imaging optical system configured to project the irradiation light emitted from the screen toward the front windshield.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 15 is a diagram illustrating the track of a scanning line when two-dimensional scanning is performed, according to an embodiment of the present disclosure.

DETAILED DESCRIPTION

Figure 1:
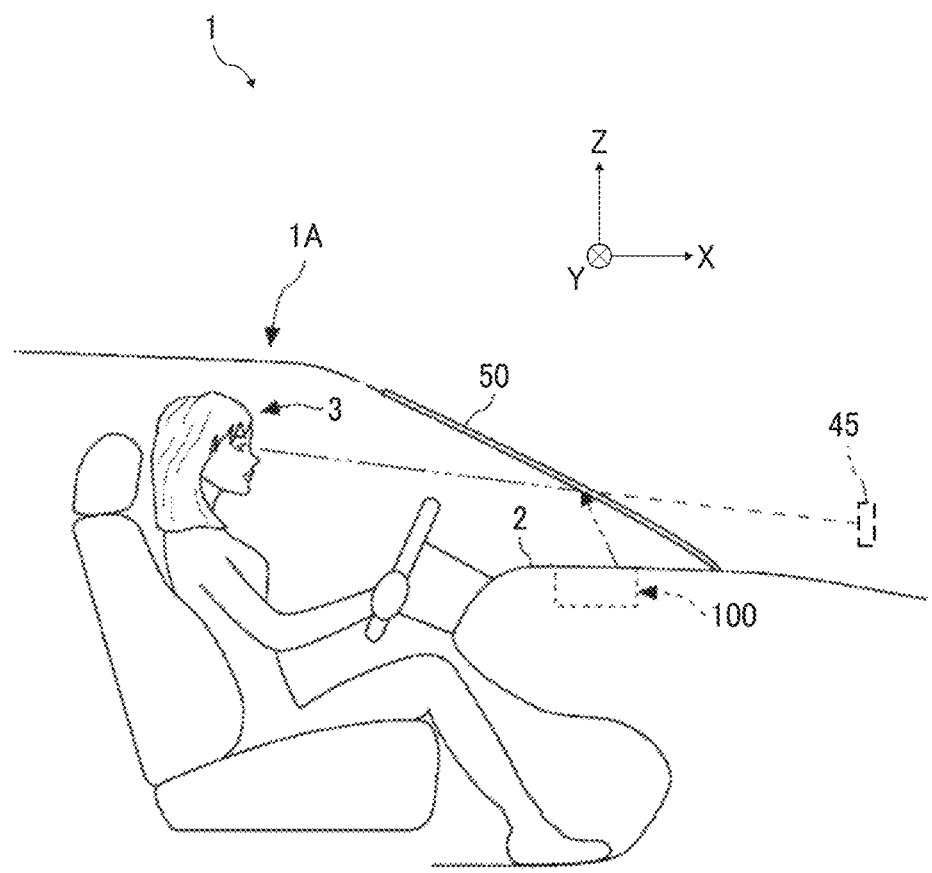
FIG. 1 is a diagram illustrating a system configuration of a display system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

The terminology used herein is for the purpose of describing particular embodiments only and is not intended to be limiting of the present disclosure. As used herein, the singular forms "a". "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present disclosure are described below with reference to the accompanying drawings. In the description of the drawings, like reference signs denote like elements, and overlapping descriptions are omitted.

FIG. 1 is a diagram illustrating a system configuration of a display system 1 according to the present embodiment.

In the display system 1, the viewer 3 can visually identify a display image as the projection light that is projected from a mounted device 100 is projected onto a transmissive reflector. The display image is image superimposed on the viewing field of the viewer 3 as a virtual image 45. For example, the display system 1 is provided for a mobile object such as a vehicle, an aircraft, and a ship, or an immobile object such as a maneuvering simulation system, and a home-theater system. In the present embodiment, cases are described in which the display system 1 is provided for a car that is an example of a mobile object 1A. However, no limitation is intended thereby, and the type of usage of the display system 1 is not limited to the present embodiment. The coordinate axes are defined as follows assuming that the directions of travel of the mobile object 1A is the X-axis direction, the right and left directions of the mobile object 1A is the Y-axis direction, and the up-and-down directions of the mobile object 1A is the Z-axis direction.

For example, the display system 1 is mounted in a vehicle, and makes navigation information visible to the viewer 3 (i.e., the driver) through a front windshield 50 of the vehicle. The navigation information includes, for example, the information about the speed of the vehicle, the course information, the distance to a destination, the name of the current place, the presence or position of an object ahead of the vehicle, a traffic sign indicating, for example, speed limit, and traffic congestion, and aids the driving of the vehicle. In such cases, the front windshield 50 serves as a transmissive reflector that transmits a portion of the incident light and reflects at least some of the remaining incident light. The distance between the location of the eyepoint of the viewer 3 and the front windshield 50 is about several tens of centimeters (cm) to one meter (m). In some embodiments, a combiner that is made of a small transparent plastic disk or the like may be used as a transmissive reflector in place of the front windshield 50.

For example, the mounted device 100 is a heads-up display (HUD). The mounted device 100 may be disposed at any desired position in conformity with the interior design of the car. For example, the mounted device 100 may be disposed under a dashboard 2 of the car or may be embedded in the dashboard 2. In the present embodiment, cases in which the mounted device 100 is mounted in the dashboard 2 are described.

Figure 2:
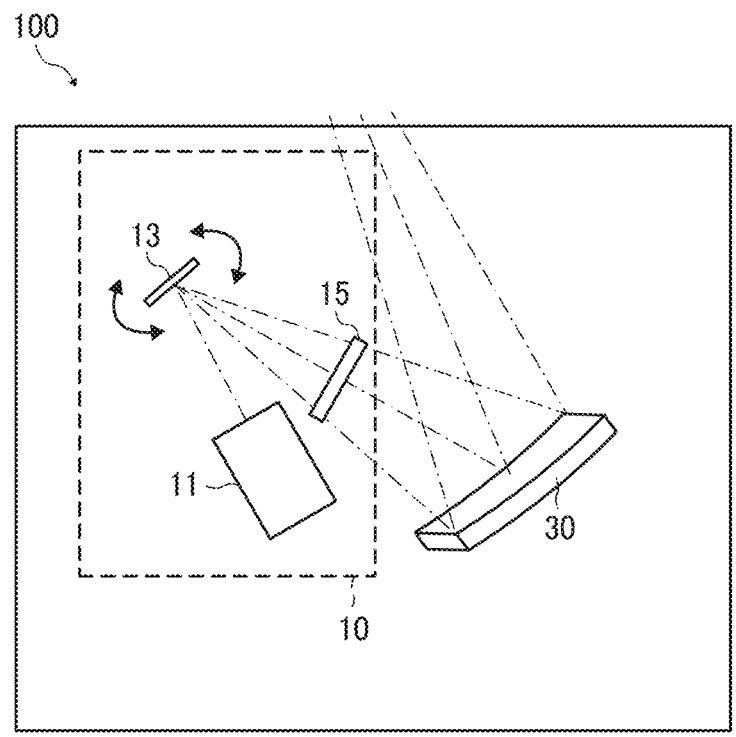
FIG. 2 is a diagram illustrating a configuration of a mounted device according to an embodiment of the present disclosure.

FIG. 2 is a diagram illustrating a configuration of the mounted device 100 according to the present embodiment.

The mounted device 100 includes a display device 10, a free-form surface mirror 30, and a front windshield 50.

The display device 10 is an example of an optical scanner and alight reflection device, and is provided with a light-source device 11, a light deflector 13, a screen 15. The light deflector 13 is an example of an optical scanner and a reflector. The light-source device 11 is a device that emits the laser beams emitted from a light source outside the device. For example, the light-source device 11 may emit laser beams in which three-color laser beams of red, green, and blue (RGB) are combined. The laser beams that are emitted from the light-source device 11 are guided to the reflection plane of the light deflector 13. For example, the light-source device 11 has a semiconductor light-emitting element such as a laser diode (LD) that serves as a light source. However, no limitation is intended thereby, and the light source may be a semiconductor light-emitting element such as a light-emitting diode (LED).

The light deflector 13 is an example of an image forming unit that receives the irradiation light emitted from the light-source device 11 and emits image light for forming an image, and uses, for example, a micro-electromechanical systems (MEMS) to change the directions of travel of the laser beams. For example, the light deflector 13 is configured by a scanner such as a mirror system composed of one minute MEMS mirror that pivots around two axes orthogonal to each other or two MEMS mirrors that pivot or rotates around one axis, and reflects the light emitted from the light-source device 11. The laser beams emitted from the light deflector 13 scans the screen 15. The light deflector 13 is not limited to a MEMS mirror, but may be configured by a polygon mirror or the like.

The screen 15 is an example of a screen on which the image light emitted from the light deflector 13 forms an image, and serves as a divergent part through which laser beams diverge at a predetermined divergence angle. For example, the screen 15 may consist of an exit pupil expander (EPE), and may be configured by a transmissive optical element such as a microlens array (MLA) or diffuser panel that diffuses light. Alternatively, the screen 15 may be configured by a reflective optical element such as a micromirror array that diffuses light. The screen 15 forms a two-dimensional intermediate image on the screen 15 as the laser beams emitted from the light deflector 13 scan the surface of the screen 15.

In the present embodiment, a method of projecting an image using the display device 10 may be implemented by a panel system or a laser scanning system. In the panel system, the intermediate image is formed by an imaging device such as a liquid crystal panel, a digital micromirror device (DMD) panel (digital micromirror device panel), or a vacuum fluorescent display (VFD). In the laser scanning system, the intermediate image is formed by scanning the laser beams emitted from the light-source device 11, using an optical scanner.

In the present embodiment, it is assumed that the display device 10 adopts the laser scanning system. In particular, in the laser scanning system, since emitting/non-emitting can be assigned to each pixel, in general, a high-contrast image can be formed. In some alternative embodiments, the panel system such as a DMD panel may be adopted as the projection system in the display device 10.

The virtual image 45 is projected onto the free-form surface mirror 30 and the front windshield 50 as the intermediate image that is formed by the laser beams (bundle of laser beams) emitted from the screen 15 is magnified for view. The free-form surface mirror 30 is designed and arranged so as to cancel, for example, the inclination of the image, the distortion of the image, and the displacements of the image, which are caused by the bent shape of the front windshield 50. The free-form surface mirror 30 may be arranged in a pivotable manner around the rotation axis. Due to such a configuration, the free-form surface mirror 30 can adjust the reflection direction of the laser beams (bundle of laser beams) emitted from the screen 15 to change the position at which the virtual image 45 is displayed.

In the present embodiment, the free-form surface mirror 30 is designed using a commercially available optical design simulation software such that the free-form surface mirror 30 has a certain level of light-gathering power to achieve a desired image-forming position of the virtual image 45. In the display device 10, the light-gathering power of the free-form surface mirror 30 is designed such that the virtual image 45 is displayed at a position away from the location of the eyepoint of the viewer 3 in the depth direction by, for example, at least 1 m and equal to or shorter than 30 m (preferably, equal to or shorter than 10 m). The free-form surface mirror 30 may be a concave mirror or an element with a light-gathering power. The free-form surface mirror 30 is an example of an imaging optical system.

The front windshield 50 serves as a transmissive reflector that transmits some of the laser beams (bundle of laser beams) and reflects at least some of the remaining laser beams (partial reflection). The front windshield 50 may serve as a semitransparent mirror through which the viewer 3 visually recognizes the virtual image 45 and the scenery ahead of the mobile object (vehicle). The virtual image 45 is an image that is visually recognized by the viewer 3, including vehicle-related information (e.g., speed and travel distance), navigation information (e.g., route guidance and traffic information), and warning information (e.g., collision warning). For example, the transmissive reflector may be another front windshield arranged in addition to the front windshield 50. The front windshield 50 is an example of a reflector.

The virtual image 45 may be displayed so as to be superimposed on the scenery ahead of the front windshield 50. The front windshield 50 is not flat but is curved. For this reason, the position at which the virtual image 45 is formed is determined by the curved surface of the free-form surface mirror 30 and the front windshield 50. In some embodiments, the front windshield 50 may be a semitransparent mirror (combiner) that serves as a separate transmissive having a reflector partial reflection function.

Due to such a configuration as above, the laser beams (bundle of laser beams) emitted from the screen 15 are projected toward the free-form surface mirror 30, and are reflected by the front windshield 50. Accordingly, the viewer 3 can visually recognize the virtual image 45, i.e., the magnified image of the intermediate image formed on the screen 15, due to the light reflected by the front windshield 50.

Figure 3:
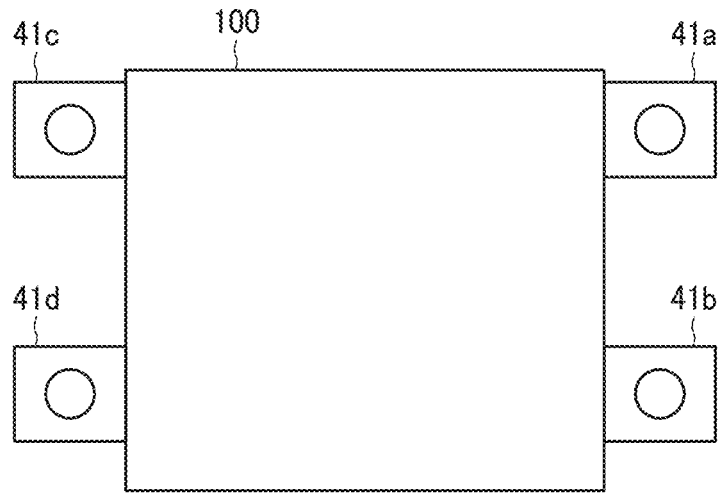
FIG. 3 is a top view of a mounted device according to an embodiment of the present disclosure.

FIG. 3 is a diagram illustrating atop view of the mounted device 100 according to the present embodiment.

As illustrated in FIG. 3, the mounted device 100 includes two attaching parts 41a and 41b on the right side, and includes two attaching parts 41c and 41d on the left side. These attaching parts 41a, 41b, 41c, and 41d are attach the mounted device 100 to the mobile object 1A. Each of the attaching parts 41a to 41d has a screw hole, and the mounted device 100 is attached to the mobile object 1A through these screw holes.

Figure 4:
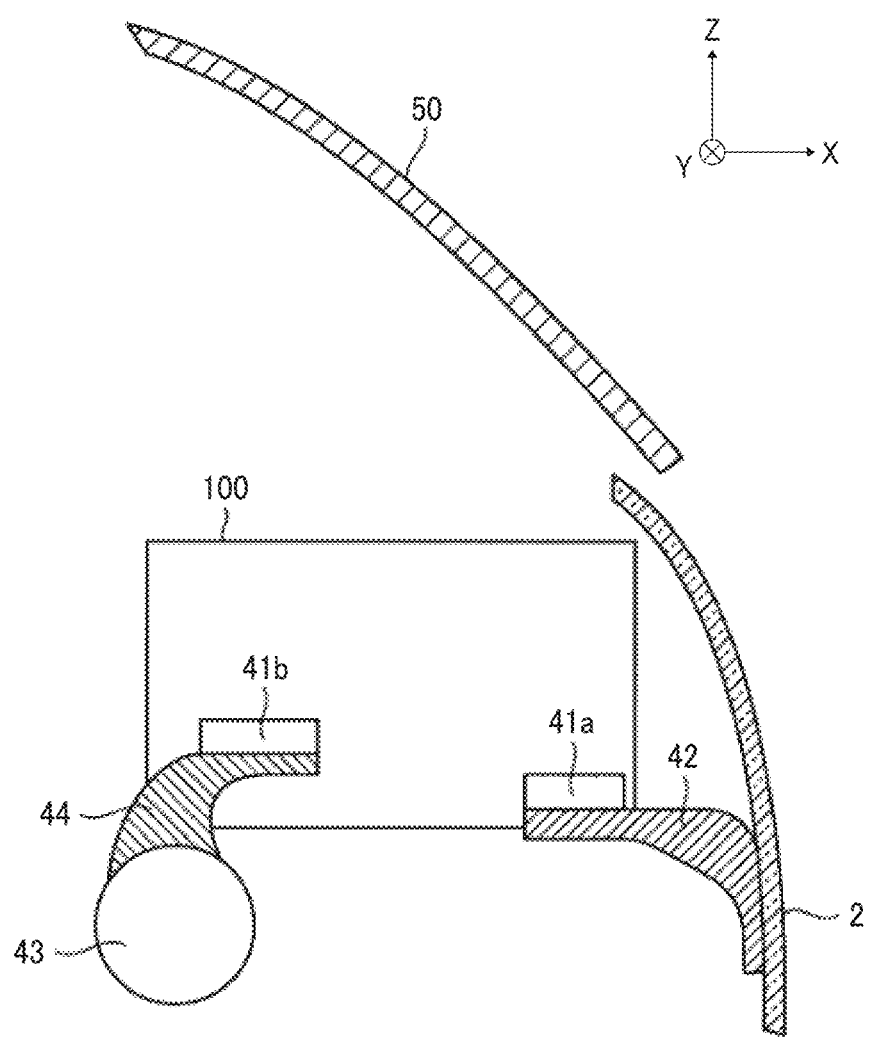
FIG. 4 is a side view of a mounted device according to an embodiment of the present disclosure.

FIG. 4 is a right side view of the mounted device 100 attached to the mobile object 1A, according to the present embodiment.

The mobile object 1A includes an attaching bracket 42, which is welded or fastened to the dashboard 2, and an attaching bracket 44, which is welded or fastened to a cross car beam 43. The attaching bracket 42 and the attaching bracket 44 are an example of an installation part. The mounted device 100 is attached to the mobile object 1A by fastening the attaching parts 41a and 41c to the attaching bracket 42 using screws or the like and by fastening the attaching parts 41b and 41d to the attaching bracket 44 using screws or the like.

Figure 5:
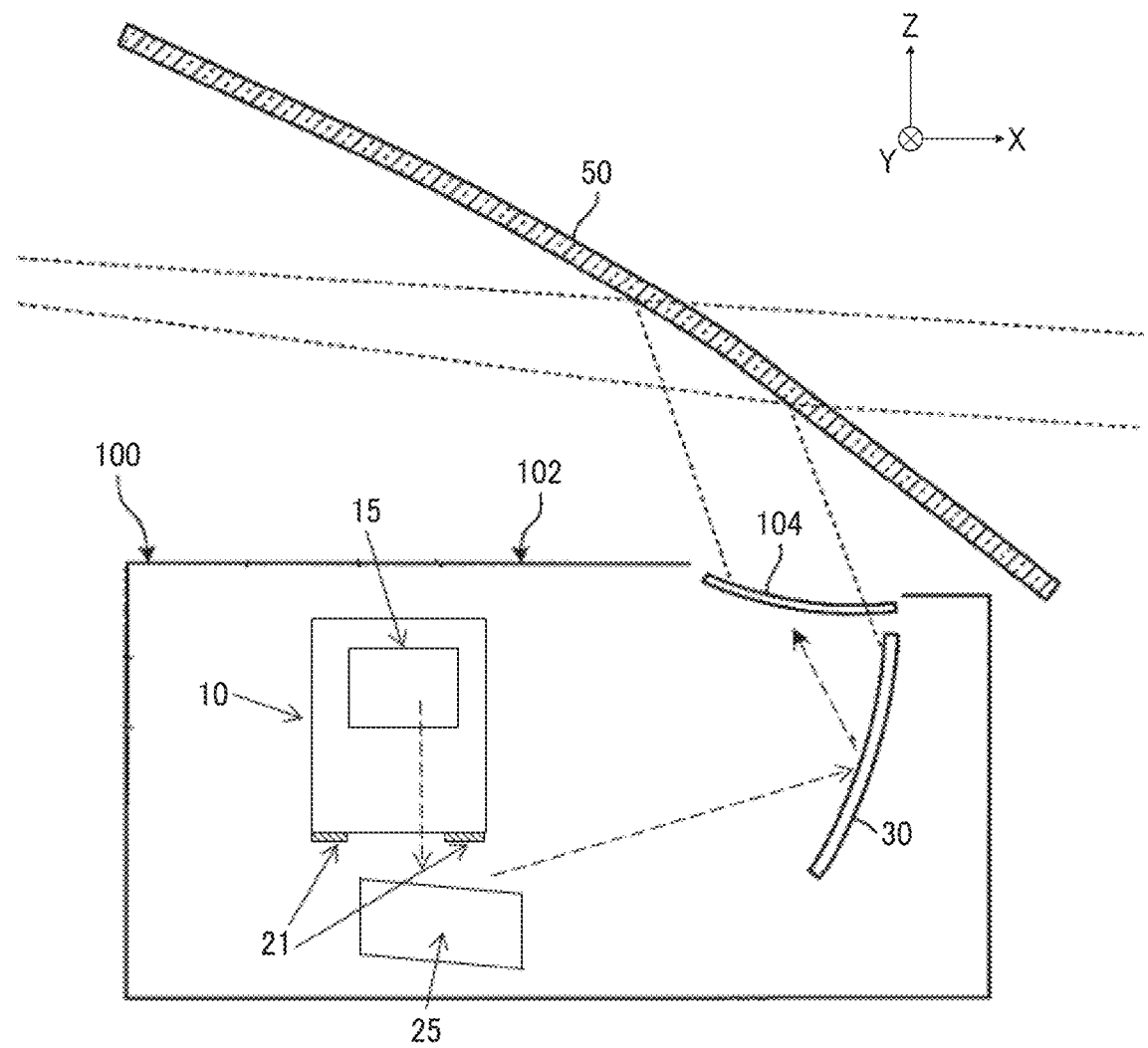
FIG. 5 is a cross-sectional side view of a mounted device according to an embodiment of the present disclosure.

FIG. 5 is across-sectional side view of the mounted device 100 as viewed from the right direction (the right side in the Y-direction), according to the present embodiment.

Figure 6:
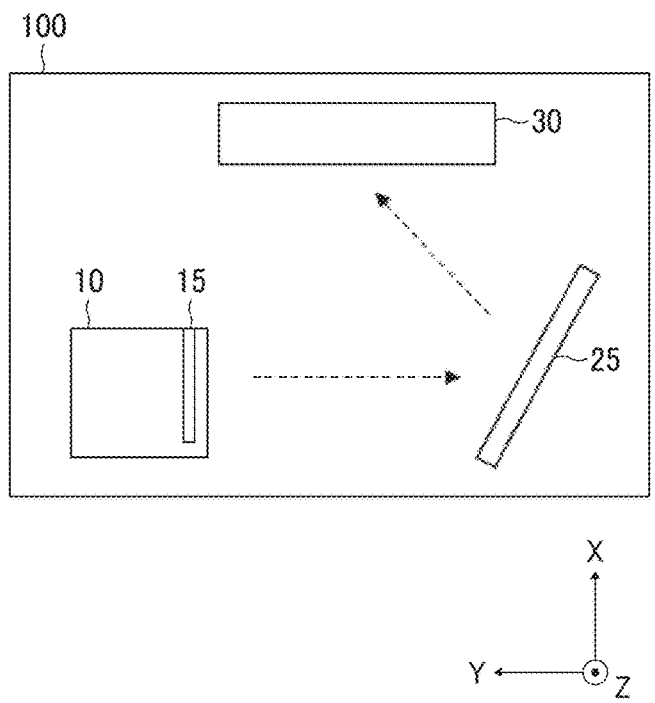
FIG. 6 is a cross-sectional top view of a mounted device according to an embodiment of the present disclosure.

FIG. 6 is across-sectional top view of the mounted device 100 as viewed from the upward direction (the Z-direction), according to the present embodiment.

FIG. 5 and FIG. 6 illustrate a concrete arrangement inside the mounted device 100 according to the present embodiment.

In addition to the display device 10 and the free-form surface mirror 30 as described above with reference to FIG. 2, the mounted device 100 includes a mirror 25 that is arranged inside a housing 102 to reflect the laser beams projected from the display device 10 toward the free-form surface mirror 30. The housing 102 has an exit window that transmits the light reflected by the free-form surface mirror 30 and projects the reflected light onto the front windshield 50. The display device 10 and the screen 15 are arranged so that the laser beams are projected in the right direction (the right side in the Y-direction).

Figure 7:
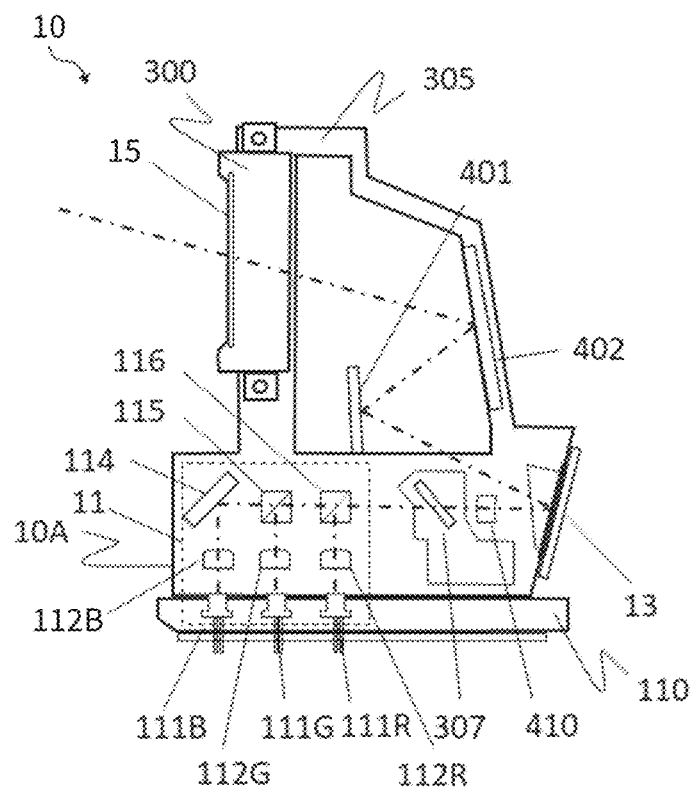
FIG. 7 is a diagram illustrating a configuration of a display device according to an embodiment of the present disclosure.

FIG. 7 is a diagram illustrating a configuration of the display device 10 according to the present embodiment.

In addition to the light-source device 11, the light deflector 13, and the screen 15 as described above with reference to FIG. 2, the display device 10 further includes a filter 307 that modulates the laser beams emitted from the light-source device 11, a condenser lens 410 that condenses the laser beams modulated by the filter 307 toward the light deflector 13, a first mirror 401 that reflects the laser beams deflected by the light deflector 13, and a second mirror 402 that reflects the laser beams reflected by the first mirror 401 toward the screen 15.

The light-source device 11 includes light-source elements 111R, 111G, and 111B (these light-source elements may be referred to simply as a light-source element 111 in the following description when it is not necessary to distinguish each of the light-source elements), coupling lenses (collimator lenses) 112R, 112G, and 112B, apertures 113R, 113G, and 113B, combiners 114, 115, and 116, and a lens 117.

For example, each of the light-source elements 111R, 111G, and 111B of three colors (red, green, and blue (RGB))

is a laser diode (LD) having a single or a plurality of light-emitting points. The light-source elements 111R, 111G, and 111B emit laser beams (light flux) having different wavelengths λR, λG, and λB, respectively. For example, λR=640 nanometers (nm), λG=530 nm, and λB=445 nm.

The emitted laser beams (light flux) are coupled by the coupling lenses 112R, 112G, and 112B, respectively, and become approximately collimated light flux. The coupled laser beams (light flux) are combined by the three combiners 114, 115, and 116. The combiners 114, 115, and 116 are plate-like or prismatic dichroic mirrors, and reflect or transmit the laser beams (light flux) therethrough according to the wavelength of the laser beams to combine the laser beams into one bundle of laser beams (light flux) that travels along one optical path. The combined laser beams (light flux) pass through the filter 307 and the condenser lens 410 and are guided to the light deflector 13.

The display device 10 is formed by assembling a housing 10A, a mirror unit (mirror holding member) 305, and a screen unit 300. The housing 10A holds and stores the light-source elements 111R, 111G, and 111B, the coupling lenses 112R, 112G, and 112B, the combiners 114, 115, and 116, the filter 307, the condenser lens 410, and the light deflector 13. The mirror unit 305 holds the first mirror 401 and the second mirror 402. The screen unit 300 is an example of a holding member that holds the screen 15.

A light source unit 110 is removable from the housing 10A and holds the light-source elements 111R, 111G, and 111B.

Figure 8:
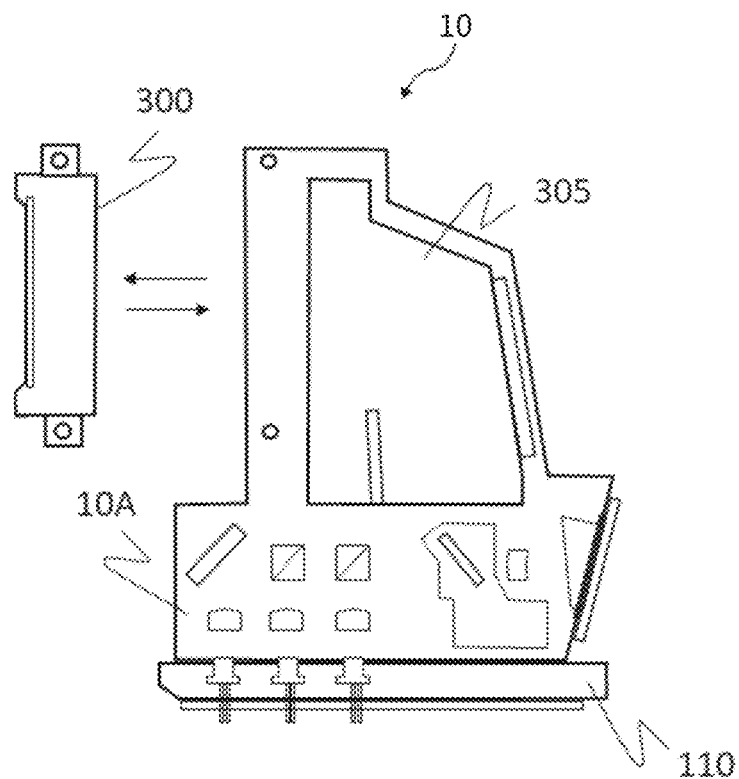
FIG. 8 is a diagram illustrating how a screen unit is attached to and removed from a display device, according to an embodiment of the present disclosure.

FIG. 8 illustrates how the screen unit 300 is attached to and removed from the display device 10, according to the present embodiment.

The screen unit 30 is attachable to and removable from the housing 10A without removing the light source unit 110 and the mirror unit 305 from the housing 10A. Moreover, the screen unit 300 is attachable to and removable from the housing 10A without removing the light-source device 11, the filter 307, the condenser lens 410, and the light deflector 13 from the housing 10A.

The housing 10A is made of die-casting aluminum, and the mirror unit 305 is made of resin. The housing 10A has a higher thermal conductivity than the mirror unit 305.

The image light that diverges through the screen 15 reaches the front windshield 50 along the optical path as illustrated in FIG. 1 and FIG. 2. However, in actual use, the sunlight that irradiates the front windshield 50 may travel reversely along the optical path and may reach the screen 15 or the screen unit 300. In such cases, the shape or color of the screen 15 may change due to the heat of the sunlight, and the image quality may deteriorate.

In order to handle such a situation, in the present embodiment, the screen unit 300 is attached to the housing 10A. By so doing, compared with a case in which the screen unit 300 is attached to the mirror unit 305 that is positioned on the upstream side on the optical path, the heat of the screen 15 and the screen unit 300 can be easily dissipated, and the reduction in image quality can be prevented.

Moreover, the screen unit 300 is attachable to and removable from the housing 10A without removing, for example, the first mirror 401 and the second mirror 402 held by the mirror unit 305, the light deflector 13 from the housing 10A. Due to this configuration, the replacement or maintenance of the screen unit 300 can easily be performed in an independent manner. Accordingly, even when the shape or color of the screen 15 changes, the reduction in image quality can be prevented by performing replacement or maintenance of the screen 15.

As the curvature of the front windshield 50 differs depending on its type (vehicle type) of the mobile object 1A, the size, the position, and the angle of the screen 15 need to be adjusted in a delicate manner in accordance with the imaging optical system (i.e., the free-form surface mirror 30). However, by making the screen unit 300 detachable from the housing 10A or the like, the housing 10A or the like can be shared, and the productivity can be improved.

Figure 9:
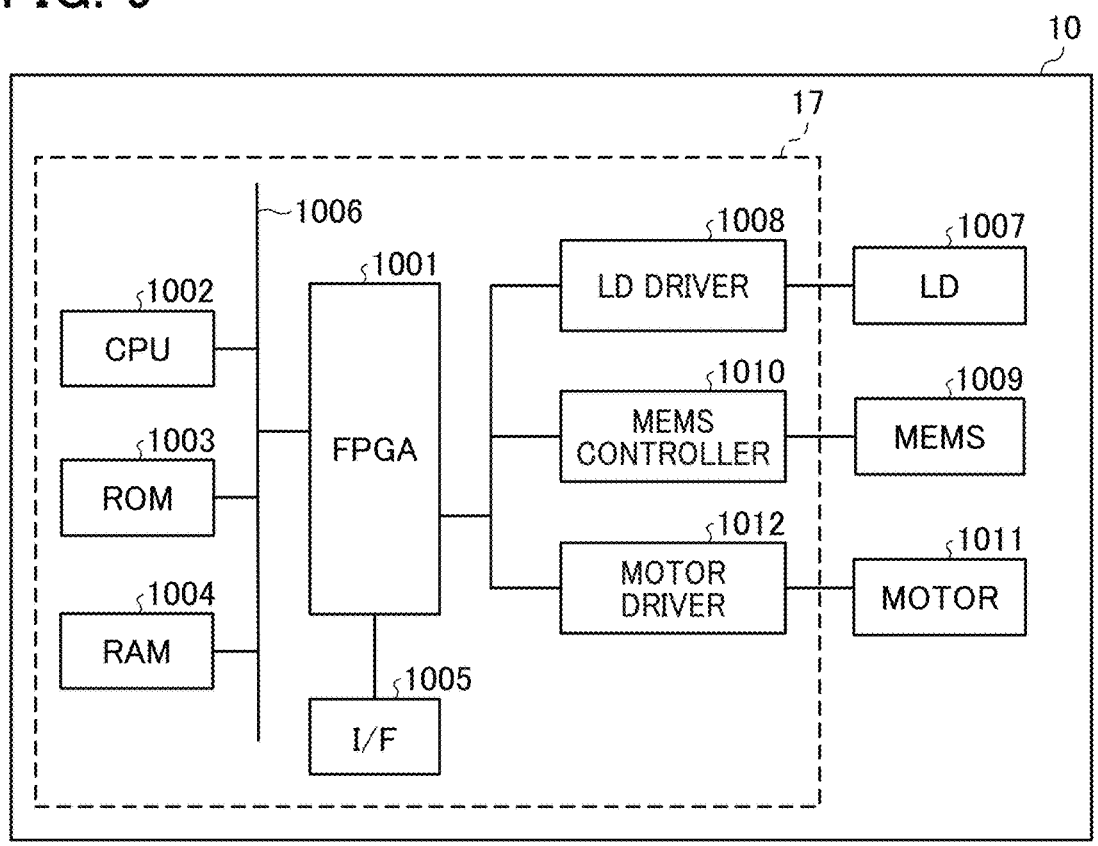
FIG. 9 is a diagram illustrating a hardware configuration of a display device according to an embodiment of the present disclosure.

FIG. 9 is a diagram illustrating a hardware configuration of the display device 10 according to the present embodiment.

When necessary, some components or elements may be added to or deleted from the hardware configuration illustrated in FIG. 2.

The display device 10 includes a controller 17 that controls the operation of the display device 10. For example, the controller 17 is a circuit board or integrated circuit (IC) chip mounted inside the display device 10. The controller 17 includes a field-programmable gate array (FPGA) 1001, a central processing unit (CPU) 1002, a read only memory (ROM) 1003, a random access memory (RAM) 1004, an interface (I/F) 1005, a data bus line 1006, a laser diode (LD) driver 1008, a micro-electromechanical systems (MEMS) controller 1010, and a motor driver 1012.

The FPGA 1001 is an integrated circuit that is configurable by the designer of the display device 10. The LD driver 1008, the MEMS controller 1010, and the motor driver 1012 generate a driving signal according to the control signal output from the FPGA 1001. The CPU 1002 is an integrated circuit that controls the entirety of the display device 10. The ROM 1003 is a storage device that stores a program for controlling the CPU 1002. The RAM 1004 is a storage device that serves as a work area of the CPU 1002. The interface 1005 communicates with an external device. For example, the interface 1005 is coupled to the controller area network (CAN) of a vehicle.

For example, the LD 1007 is a semiconductor light-emitting element that configures a part of the light-source device 11. The LD driver 1008 is a circuit that generates a driving signal for driving the LD 1007. The MEMS 1009 configures a part of the light deflector 13 and moves the scanning mirror. The MEMS controller 1010 is a circuit that generates a driving signal for driving the MEMS 1009. The motor 1011 is an electric motor that rotates the rotation axis of the free-form surface mirror 30. The motor driver 1012 is a circuit that generates a driving signal for driving the motor 1011.

Figure 10:
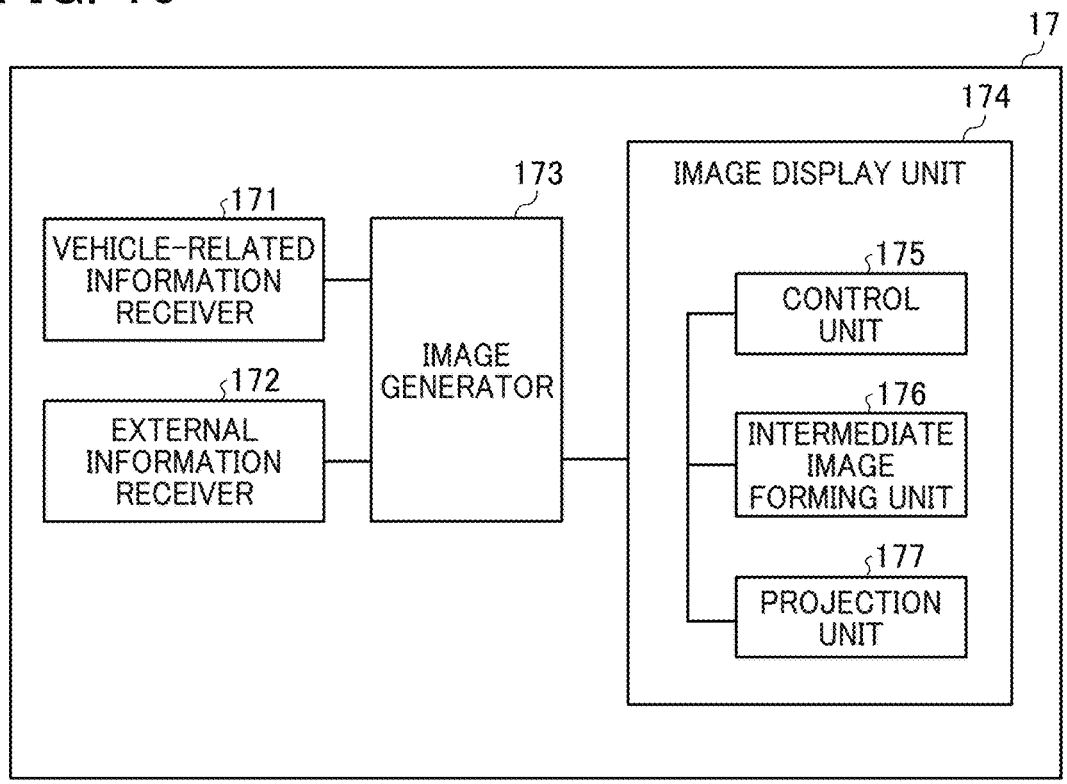
FIG. 10 is a diagram illustrating a functional configuration of a display device according to an embodiment of the present disclosure.

FIG. 10 is a diagram illustrating a functional configuration of the display device 10 according to the present embodiment.

The functions that are implemented by the display device 10 include a vehicle-related information receiver 171, an external information receiver 172, an image generator 173, and an image display unit 174.

The vehicle-related information receiver 171 is a function to receive vehicle-related information (e.g., speed and travel distance) from a controller area network (CAN) or the like. For example, the vehicle-related information receiver 171 is implemented by some of the elements illustrated in FIG. 2. In particular, the vehicle-related information receiver 171 may be implemented by the interface 1005, the processing performed by the CPU 1002, and a program stored in the ROM 1003.

The external information receiver 172 receives external information (for example, position information from the global positioning system (GPS), routing information from a navigation system, and traffic information) of the vehicle from an external network. For example, the external information receiver 172 is implemented by some of the elements illustrated in FIG. 2. In particular, the external information receiver 172 may be implemented by the interface 1005, the processing performed by the CPU 1002, and a program stored in the ROM 1003.

The image generator 173 is a function to generate image data, which is used to display the intermediate image and the virtual image 45, based on the data input from the vehicle-related information receiver 171 and the external information receiver 172. For example, the image generator 173 is implemented by some of the elements illustrated in FIG. 2. In particular, the image generator 173 may be implemented by the processing performed by the CPU 1002, and a program stored in the ROM 1003.

The image display unit 174 is a function to form the intermediate image on the screen 15 based on the image data generated by the image generator 173, and to project the laser beams (bundle of laser beams) that form the intermediate image toward the front windshield 50 to display the virtual image 45. For example, the image display unit 174 is implemented by some of the elements illustrated in FIG. 2. In particular, the image display unit 174 may be implemented by the processing performed by the CPU 1002, the FPGA 1001, the LD driver 1008, the MEMS controller 1010, and the motor driver 1012, as well as a program stored in the ROM 1003.

The image display unit 174 includes a control unit 175, an intermediate image forming unit 176, and a projection unit 177. In order to form the intermediate image, the control unit 175 generates a control signal used to control the operation of the light-source device 11 and the light deflector 13. Moreover, the control unit 175 generates a control signal that controls the operation of the free-form surface mirror 30 to display the virtual image 45 at a desired position.

The intermediate image forming unit 176 forms an intermediate image on the screen 15 based on the control signal generated by the control unit 175. The projection unit 177 projects the laser beams that form the intermediate image toward the transmissive reflector (e.g., the front windshield 50) in order to form the virtual image 45 to be visually recognized by the viewer 3.

Figure 11:
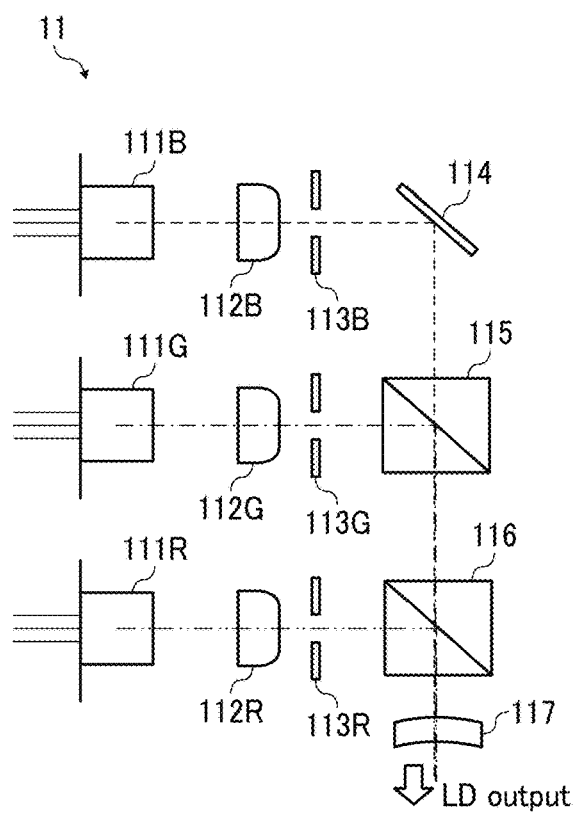
FIG. 11 is a diagram illustrating a specific configuration of a light-source device according to an embodiment of the present disclosure.

FIG. 11 is a diagram illustrating a specific configuration of the light-source device 11 according to the present embodiment.

In addition to the elements as described above with reference to FIG. 7, the light-source device 11 is provided with apertures 113R, 113G, and 113B that shape the laser beams (light flux) that are coupled by the coupling lenses 112R, 112G, and 112B, respectively. The apertures 113R, 113G, and 113B are placed between the coupling lenses 112R, 112G, and 112B and the combiners 114, 115, and 116. The shape of the apertures 113R, 113G, and 113B may be various kinds of shape such as a circle, an ellipse, a rectangle, and a square depending on, for example, certain predetermined conditions such as the divergence angle of the bundles of laser beams (light flux).

Figure 12:
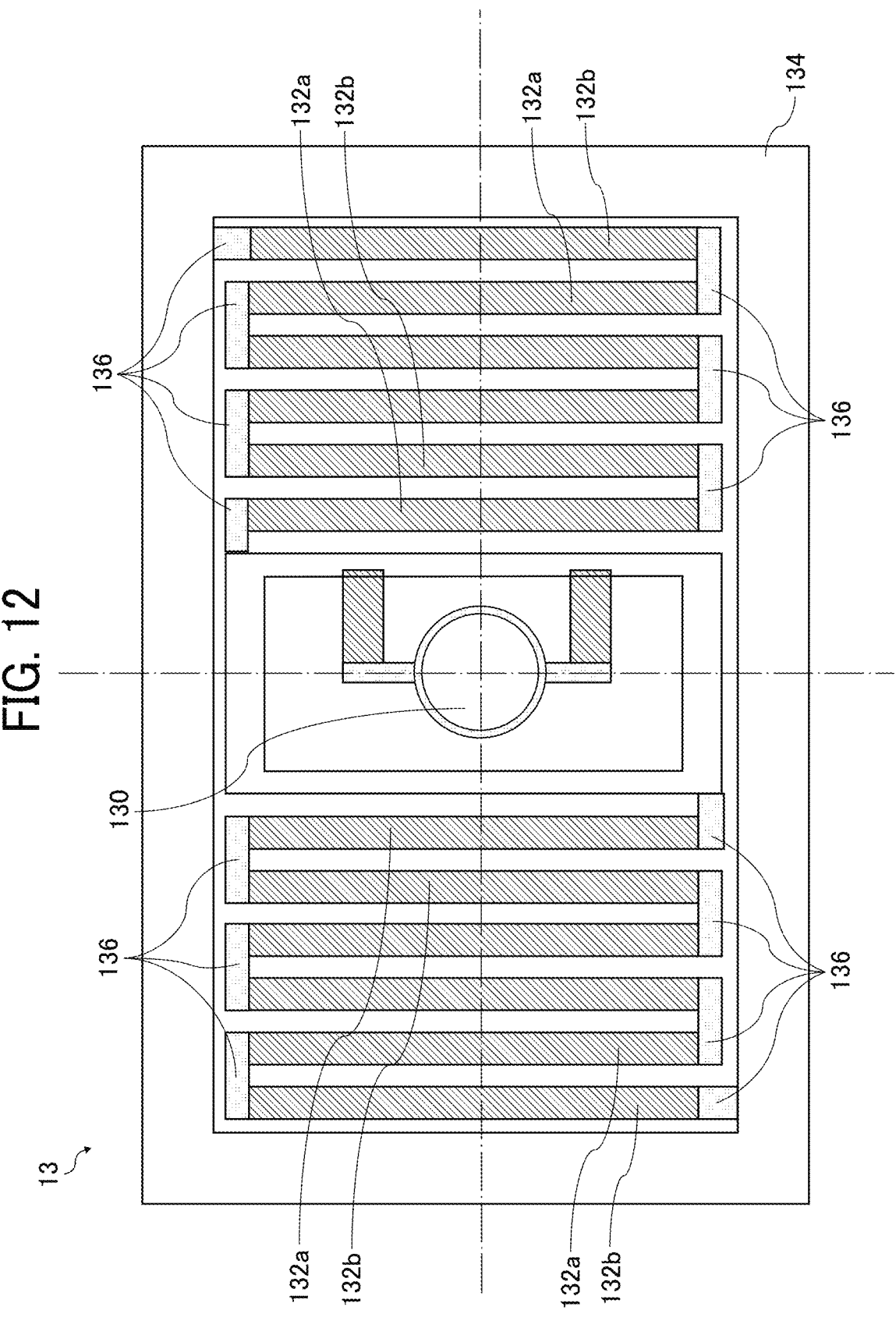
FIG. 12 is a diagram illustrating a specific configuration of a light deflector according to an embodiment of the present disclosure.

FIG. 12 is a diagram illustrating a specific configuration of the light deflector 13 according to the present embodiment.

The light deflector 13 is a MEMS mirror produced by semiconductor processing, and includes a mirror 130, a serpentine beam 132, a frame 134, and a piezoelectric member 136. The light deflector 13 is an example of a scanner.

The mirror 130 has a reflection plane that reflects the laser beams emitted from the light-source device 11 toward the screen 15 side. In the light deflector 13, a pair of serpentine beams 132 are formed across the mirror 130. Each of the pair of serpentine beams 132 has a plurality of turning portions. Each of these turning portions is configured by a first beam 132a and a second beam 132b that are arranged alternately. Each of the pair of serpentine beams 132 is supported by the frame 134. The piezoelectric member 136 is disposed such that the first beam 132a and the second beam 132b, which are adjacent to each other, are coupled to each other. The piezoelectric member 136 applies different levels of voltage to the first beam 132a and the second beam 132b to bend each of the first beam 132a and the second beam 132b differently.

As a result, the first beam 132a and the second beam 132b, which are adjacent to each other, bend in different directions. As the bending force is accumulated, the mirror 130 rotates in the vertical direction around the horizontal axis. Due to such a configuration as above, the light deflector 13 can perform optical scanning in the vertical direction at a low voltage. An optical scanning in the horizontal direction around the axis in the vertical direction is implemented by the resonance produced by a torsion bar or the like coupled to the mirror 130.

Figure 13:
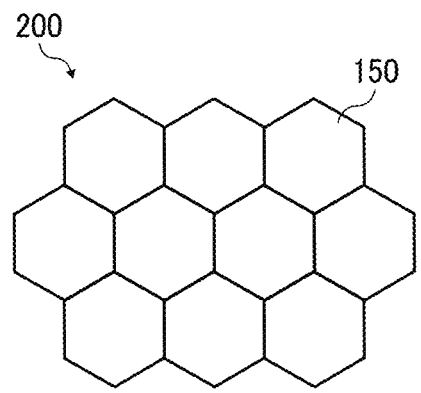
FIG. 13 is a diagram illustrating a specific configuration of a screen according to an embodiment of the present disclosure.

FIG. 13 is a diagram illustrating a specific configuration of the screen 15 according to the present embodiment.

The laser beams emitted from the LD 1007 that configures a part of the light-source device 11 form an image on the screen 15. The screen 15 serves as a divergent part through which the laser beams diverge at a predetermined divergence angle. As an example configuration in which a plurality of curved portions through which the light diverges are provided, the screen 15 as illustrated in FIG. 13 has a microlens-array structure in which a plurality of hexagonal-shaped microlenses 150 are arranged with no gap therebetween. The microlenses 150 are convex portions that are an example of the curved portions. The lens diameter of each one of the microlenses 150 (the distance between two sides that are opposed to each other) is about 200 micrometers (µm). As the microlenses 150 of the screen 15 have a hexagonal shape, the multiple microlenses 150 can be arrayed with high density. The microlens array 200 and the microlenses 150 according to the present embodiment will be described later in detail.

Figure 14:
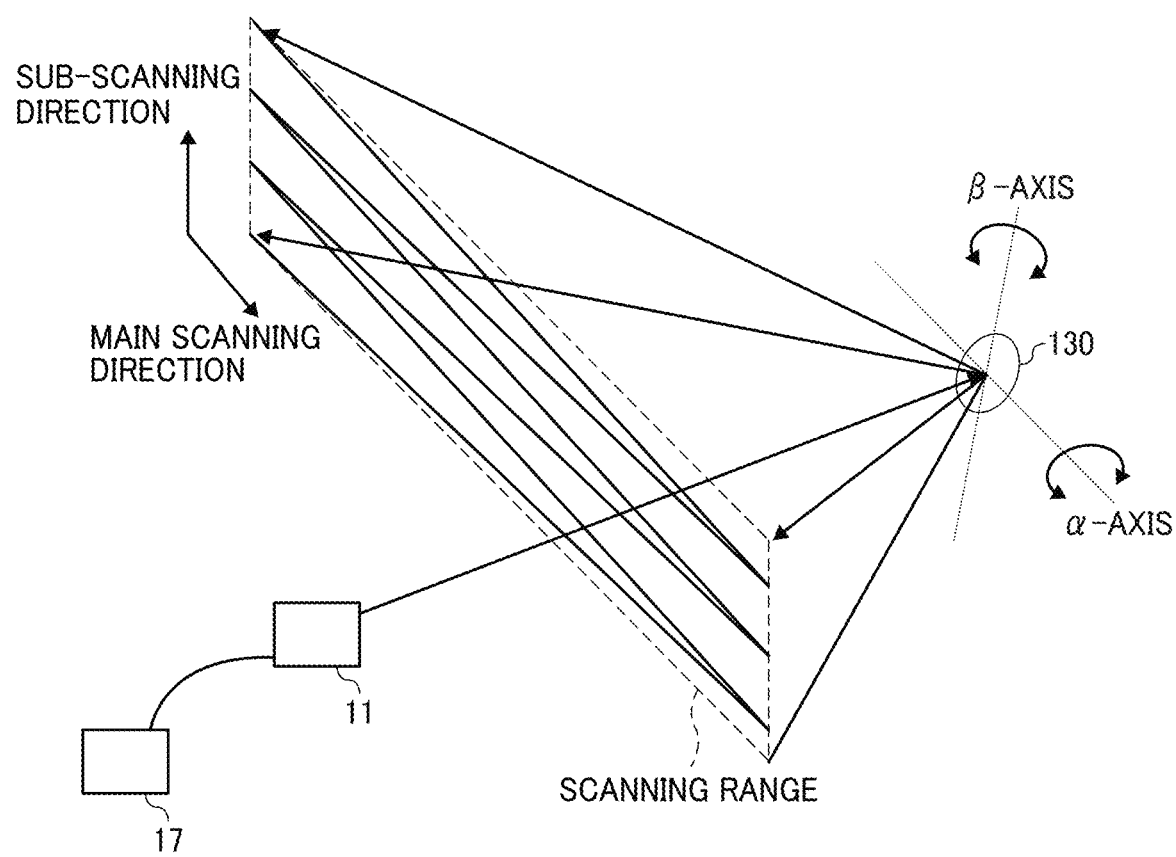
FIG. 14 is a diagram illustrating the relation between a mirror of a light deflector and the scanning range, according to an embodiment of the present disclosure.

FIG. 14 is a diagram illustrating the relation between the mirror 130 of the light deflector 13 and the scanning range, according to the present embodiment.

The FPGA 1001 controls the light-emission intensity, the timing of light emission, and the light waveform of the multiple light-source elements in the light-source device 11. The LD driver 1008 drives the multiple light-source elements of the light-source device 11 to emit laser beams. As illustrated in FIG. 14, the laser beams that are emitted from the multiple light-source elements and whose optical paths are combined are two-dimensionally deflected about the a axis and the p axis by the mirror 130 of the light deflector 13, and the screen 15 is irradiated with the laser beams deflected by the mirror 130, which serve as scanning beams. In other words, the screen 15 is two-dimensionally scanned by main scanning and sub-scanning by the light deflector 13.

In the present embodiment, the entire area to be scanned by the light deflector 13 may be referred to as a scanning range. The scanning beam scans (two-way scans) the scanning range of the screen 15 in an oscillating manner in the main scanning direction at a high frequency of about 20,000 to 40,000 hertz (Hz), and scans (one-way scans) the scanning range of the screen 15 in the sub-scanning direction at a low frequency of about a few tens of Hz. In other words, the light deflector 13 performs raster scanning on the screen 15. In this configuration, the display device 10 controls the light emission of the multiple light-source elements according to the scanning position (the position of the scanning beam). Accordingly, an image can be drawn on a pixel-by-pixel basis and a virtual image can be displayed.

As described above, the sub-scanning cycle is about a few tens of Hz. Accordingly, the length of time to draw an image of one frame, i.e., the length of time to scan one frame (one cycle of two-dimensional scanning) is a few tens of millisecond (msec). For example, assuming that the main-scanning cycle and the sub-scanning cycle are 20000 Hz and 50 Hz, respectively, the length of time to scan one frame is 20 msec.

FIG. 15 is a diagram illustrating the track of a scanning line when two-dimensional scanning is performed, according to the present embodiment.

As illustrated in FIG. 15, the screen 15 includes an image area 61 (i.e., an effective scanning area) and a frame area 62 that surrounds the image area 61. The image area 61 is irradiated with the light that is modulated according to the image data, and the intermediate image is drawn on the image area 61.

In the present embodiment, the scanning range includes the image area 61 and a part of the frame area 62 (i.e., a portion around the peripheral area of the image area 61) on the screen 15. In FIG. 15, the track of the scanning line in the scanning range is indicated by a zigzag line. For the sake of explanatory convenience, the number of scanning lines in FIG. 15 is less than the actual number of scanning lines.

As described above, the screen 15 is configured by a transmissive optical element such as the microlens array 200 that diffuses light. In the present embodiment, the shape of the image area 61 is rectangular or planar. However, no limitation is intended thereby, and the shape of the image area 61 may be polygonal or curved. Further, in some embodiments, the screen 15 may be a reflective optical element such as a micromirror array that diffuses light, depending on the design or layout of the display device 10. In the following description of the present embodiment, it is assumed that the screen 15 is configured by the microlens array 200.

The screen 15 is provided with a synchronous detection system 60 that includes a light receiver disposed at the edges of the image area 61 (a part of the frame area 62) in the scanning range. In FIG. 15, the synchronous detection system 60 is disposed on the −X and +Y side of the image area 61. More specifically, the synchronous detection system 60 is disposed at a corner on the +Y side. The synchronous detection system 60 detects the operation of the light deflector 13 and outputs, to the FPGA 1001, a synchronizing signal that determines the start timing of scanning or the end timing of scanning.

Figure 16A:
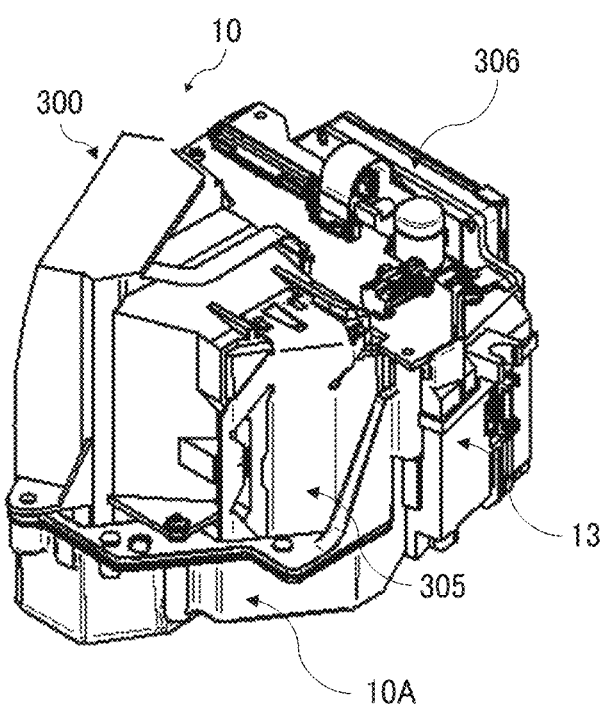
FIG. 16A and FIG. 16B are perspective view and exploded perspective view of a display device according to an embodiment of the present disclosure, respectively.
Figure 16B:
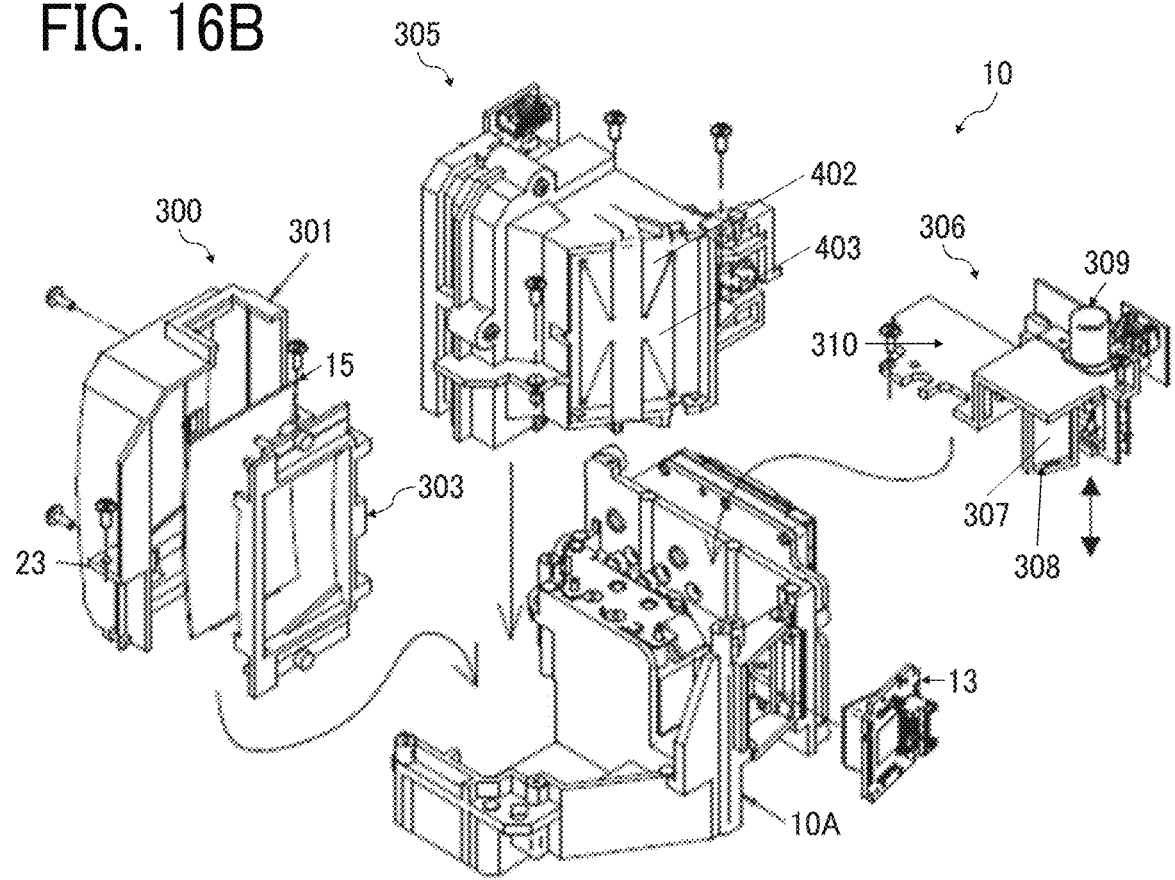

FIG. 16A and FIG. 16B are perspective view and exploded perspective view of the display device 10 according to the present embodiment, respectively.

As illustrated in FIG. 7, the display device 10 is formed by assembling the housing 10A, the mirror unit 305, and the screen unit 300. Moreover, the light deflector 13 and a dimmer unit 306 are configured so as to be detachable from the housing 10A.

The screen 15 is held by a first holder 301 and a second holder 303 that engage with each other. A pair of unit attaching part 23 are arranged on the first holder 301, and the first holder 301 is attached to the housing 10A by the pair of unit attaching part 23.

The mirror unit 305 is provided with a blade spring 403 that applies pressure to the second mirror 402, and the second mirror 402 is held such that its reflection plane abuts on the abutment plane formed on the mirror unit 305.

The dimmer unit 306 is provided with a filter holder 308 that holds a filter 307, a motor 309 that moves the filter holder 308, and a lid 310 that seals the top face of the housing 10A. The filter holder 308 is threadably fitted to the leading screw that is formed on the shaft of the motor 309 so as to be movable in the direction indicated by arrow as illustrated in FIG. 16B, and adjusts the brightness of the light that is incident on the light deflector 13 as the filter 307 moves together with the filter holder 308.

The light deflector 13 is bonded and supported on an external wall of the housing 10A such that the mirror 130 as illustrated in FIG. 12 peeps through a rectangular hole arranged on the housing 10A.

In the display device 10 mounted on the mobile object 1A, the size, the position, and the angle of, for example, the screen 15 need to be adjusted in a delicate manner as the curvature of the front windshield 50 differs depending on its type or vehicle type of the mobile object 1A. In the present embodiment, by making a unit such as the screen unit 300 or an optical component such as the light deflector 13 detachable from the housing 10A or the like, the other components can be shared, and the productivity can be improved.

Figure 17:
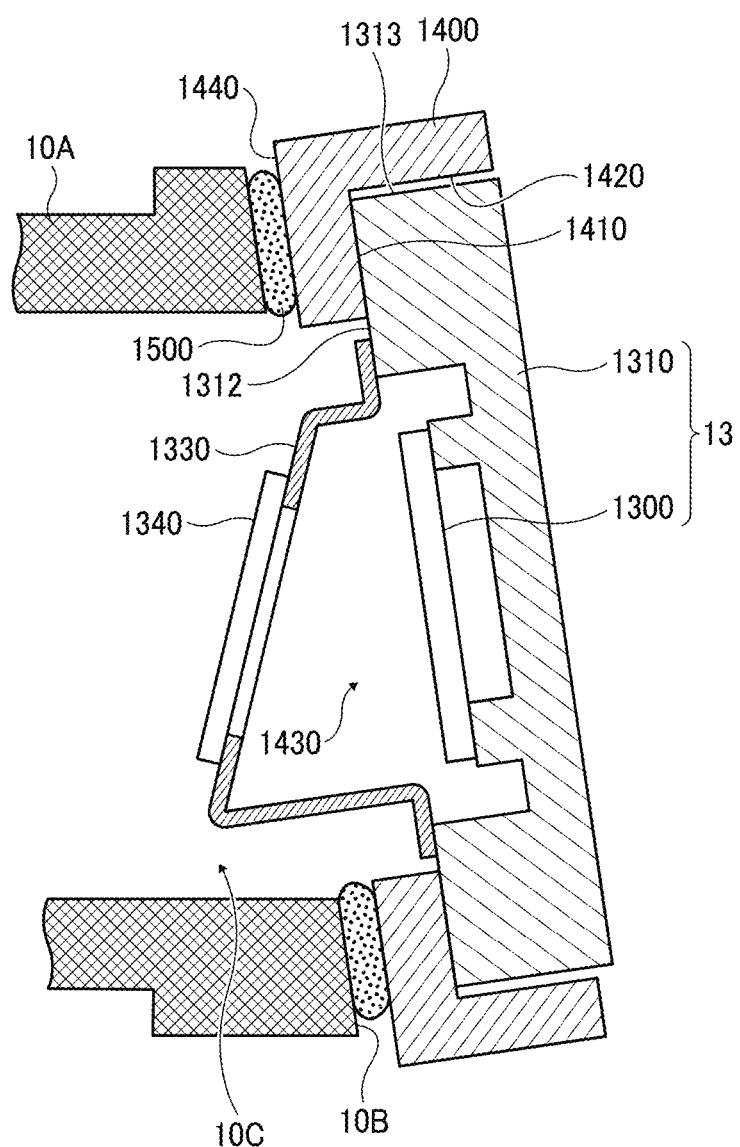
FIG. 17 is a sectional view of an optical scanner according to an embodiment of the present disclosure, illustrating how the optical scanner is installed.

FIG. 17 is a sectional view of an optical scanner (i.e., the light deflector 13) according to the present embodiment, illustrating how the optical scanner is installed.

The present embodiment relates to the holding structure or mechanism of an optical device such as a light deflector and an optical modulation element, which is implemented on a circuit board made of ceramics or a package. More specifically, the present embodiment aims at providing a light reflection device and a mobile object in which the placement accuracy with reference to the light source or the projection optical system that is held in the housing can be maintained with high stability in a configuration where the optical device is attached to a housing that is formed or molded by a material such as a resin or aluminum die-cast whose expansivity is significantly different from that of the circuit board or package even if the changes in temperature are harsh as in the room of a vehicle.

The light deflector 13 is provided with an optical scanning chip 1300 that reflects the irradiation light emitted from the light-source device 11 to perform scanning in the main scanning direction and the sub-scanning direction, a ceramic board 1310 on which a wiring pattern is formed to implement the optical scanning chip 1300, a cover 1330 that is attached to the ceramic board 1310 to cover a face of the optical scanning chip 1300, and a glass 1340 provided for the cover 1330 so as to transmit the scanning light that is scanned by the optical scanning chip 1300, and is attached to the housing 10A having the holder 1400 therebetween.

The optical scanning chip 1300 is fixed and stored parallel to the inner bottom of the ceramic board 1310, and is connected to the wiring patterns of the ceramic board 1310 through wire bonding. The cover 1330 covers and hermetically seals the opening of the ceramic board 1310, and the glass 1340 is inclined with respect to the inner bottom of the ceramic board 1310.

In other words, the glass 1340 is not parallel to the light reflection plane of the mirror of the optical scanning chip 1300. Due to such a configuration, the reflection light that is reflected by a surface of the glass 1340 can be reflected to a direction that does not affect the functionality of the light deflector 13.

The holder 1400 holds the light deflector 13, and the optical scanning chip 1300 of the light deflector 13 faces the inside of the housing 10A through an opening 1430 that is formed on the holder 1400. Moreover, the cover 1330 and the glass 1340 penetrates the opening 1430 and sticks out to the inner side of the opening of the housing 10A.

The ceramic board 1310 has a first plane 1312, and the holder 1400 has a second plane 1410 that faces and contacts the first plane 1312.

In the present embodiment, the light deflector 13 and the holder 1400 are arranged such that the first plane 1312 will be located further from the housing 10A than the second plane 1410.

In such a configuration, the first plane 1312 of the ceramic board 1310 abuts the second plane 1410 of the holder 1400 from the outside of the housing 10A. The assembly of such a configuration can be done efficiently compared with cases in which the first plane 1312 of the ceramic board 1310 abuts the second plane 1410 of the holder 1400 from the inside of the housing 10A.

An outer circumferential surface 1313 of the ceramic board 1310 is formed so as to be detached from an inner surface 1420 of the holder 1400.

In the present embodiment, after the relative positions of the light deflector 13 and the other optical elements are adjusted, the holder 1400 is attached to the housing 10A while maintaining a state in which the holder 1400 is detached from the housing 10A by a fixture.

In other words, firstly, the inclination γ around the normal line to the mirror surface and the center of the mirror surface in the XY-coordinates along an outer end face 10B of the housing 10A are determined such that the center of the mirror surface of the optical scanning chip 1300 matches the optical axis of the light-source device 11. Secondly, the inclination αβ of the normal line to the mirror surface is adjusted with reference to the optical axis such that the amplitude's center of the mirror of the optical scanning chip 1300 matches the center of the screen 15.

After that, a facing plane 1440 of the holder 1400 is bonded to the outer end face 10B of the housing 10A by an adhesive 1500. The length of spacing between the bottom face of the ceramic board 1310 and the housing 10A is determined in view of the amount of core adjustment of the optical axis. In the present embodiment, it is assumed that the thickness of adhering film is 0.8 millimeters (mm) in average and the individual variations range from 0.3 to 1.3 mm. The adhesive 1500 is, for example, an epoxide-based resin, and absorbs the ultraviolet (UV) light by cationic polymerization or is hardened by an application of heat.

In the present embodiment, the linear expansivity of the ceramic board 1310 and the linear expansivity of the housing 10A are $3\times10^{-6}/°$ C. and $23\times10^{-6}/°$ C., respectively, and the linear expansivity of the housing 10A is about ten times higher than the linear expansivity of the ceramic board 1310. For this reason, when a method of construction is adopted in which the ceramic board 1310 is directly bonded to the housing 10A, interface debonding or cohesive failure of the adhesive may occur due to the tensile stress inside the adhesive layer caused by heat stress in view of the polar regions exposed to subfreezing outside air temperature or the in-room environment of a vehicle that could be severe as intense sunlight streams through the windows or windshields and the air temperature increases to around 100 degrees Celsius ° C.

In order to handle such a situation, the holder 1400 whose linear expansivity is approximately the same as that of the housing 10A or the holder 1400 that is made of intermediate materials of the ceramic board 1310 and the housing 10A may be provided, and the gap between the holder 140 is bonded to the housing 10A may be filled with the adhesive 1500 and fixed.

In the present embodiment, the holder 1400 may be made of aluminum die-cast or aluminum casting. However, no limitation is indicated thereby, and engineering plastics whose glass fibers are enhanced and linear expansivity is approximately the same as that of aluminum may be used. Alternatively, for example, a pressed steel sheet whose linear expansivity is smaller than that of aluminum but is greater than that of ceramics may be used.

As described above, the difference between the linear expansivity of the holder 1400 and the linear expansivity of the housing 10A is smaller than the difference between the linear expansivity of the ceramic board 1310 of the light deflector 13 and the linear expansivity of the housing 10A. Due to such a configuration, the shearing stress that is applied to the adhesive 1500 due to the difference in linear expansivity can be reduced compared with cases in which the light deflector 13 is directly bonded to the housing 10A.

Figure 18:
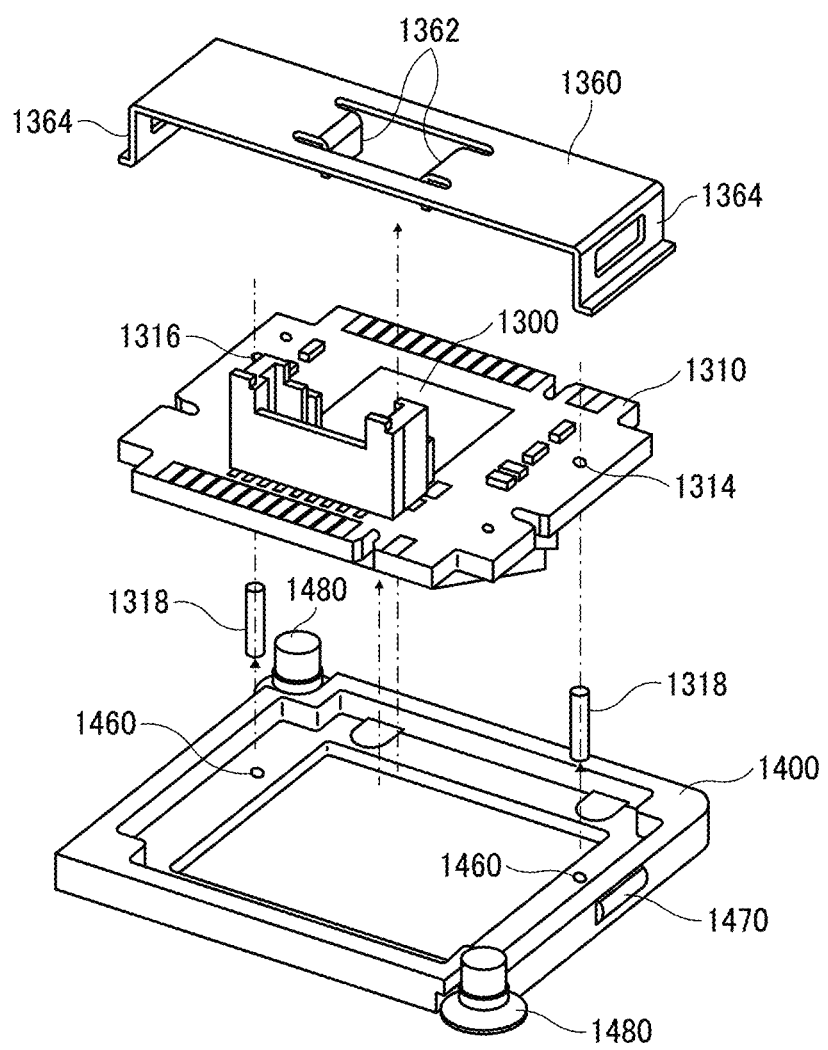
FIG. 18 is an exploded perspective view of the optical scanner as illustrated in FIG. 17.

FIG. 18 is an exploded perspective view of the optical scanner that corresponds to the light deflector 13 as illustrated in FIG. 17.

Figure 19:
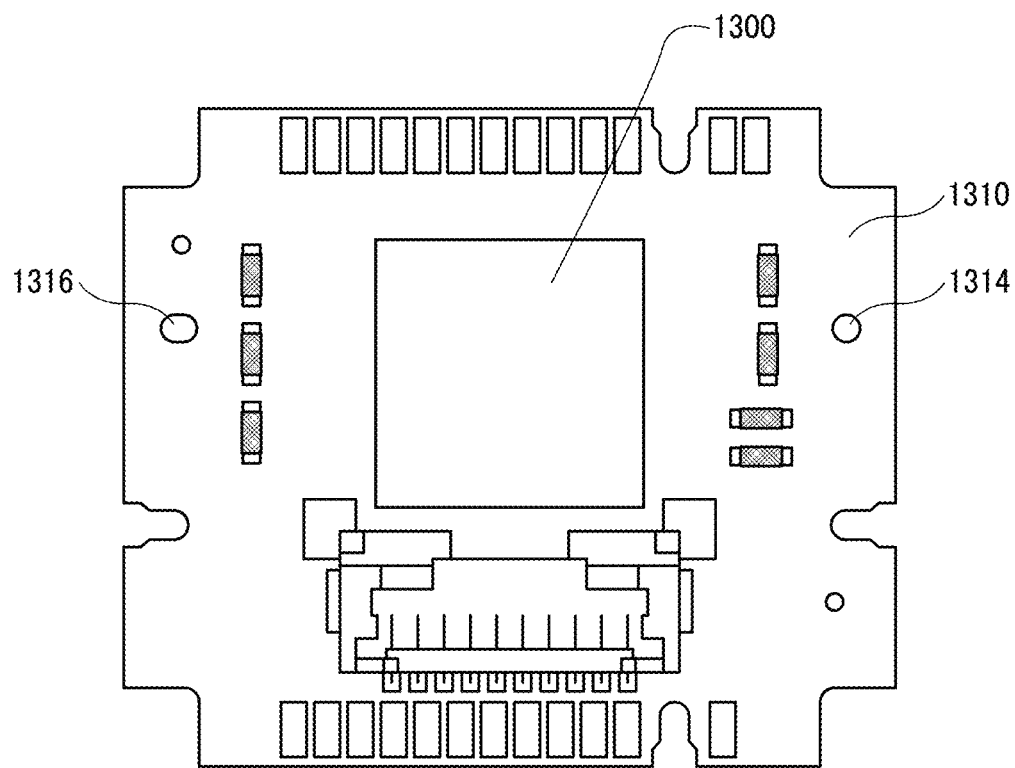
FIG. 19 is a rear view of a part of the optical scanner as illustrated in FIG. 18.

FIG. 19 is a rear view of a part of the optical scanner that corresponds to the light deflector 13 as illustrated in FIG. 18.

As illustrated in FIG. 18, the ceramic board 1310 is attached to the holder 1400 that is shaped like a box with the mirror surface of the optical scanning chip 1300 facing downward.

As illustrated in FIG. 18, the holder 1400 is provided with a clamp 1480 that is to be held by a fixture.

The light deflector 13 has a U-shaped blade spring 1360 that serves as a pressurizing member and applies pressure to the ceramic board 1310 against the holder 1400 such that the first plane 1312 contacts the second plane 1410 as illustrated in FIG. 17.

The blade spring 1360 is provided with a pair of engagement parts 1364 that engage with a pair of protrusions 1470 arranged on an outer surface of the holder 1400, and a pressing unit 1362 that presses the optical scanning chip 1300 against the holder 1400.

Due to such a configuration, the movement of the ceramic board 1310 can be controlled in a reliable manner in an direction perpendicular to the first plane 1312 as illustrated in FIG. 17 with reference to the holder 1400.

A circular hole 1314 and a duct 1316 are formed on the ceramic board 1310, and a pair of spring pins 1318 that serve as convex portions can penetrate each one of the circular hole 1314 and the duct 1316. Moreover, a pair of attaching parts 146 to which the pair of spring pins (convex portions) 1318 are fitted separately are arranged on the holder 1400.

One of the pair of spring pins 1318 serves as an anchor, and is configured to fit the circular hole 1314 that serves as a fixed point. Due to such a configuration, the movement of the ceramic board 1310 is restricted with reference to the holder 1400, and the ceramic board 1310 is fixed to the holder 1400. Alternatively, such an anchor may be implemented by, for example, adhesion or screwing instead of the spring pins 1318.

On the other hand, the other one of the pair of spring pins 1318 is configured so as to be slidable through the duct 1316. Due to such a configuration, the holder 1400 is allowed to expand in contrast with the ceramic board 1310 due to the difference in linear expansivity between the holder 1400 and the ceramic board 1310.

Due to such a configuration, the size of the ceramic board 1310 may change in contrast with the holder 1400 due to the difference in linear expansivity between the ceramic board 1310 and the holder 1400, and the direction in which the relative positions of the ceramic board 1310 and the holder 1400 change can be predicted. In other words, the direction in which the scanning light of the light deflector 13 is shifted due to the difference in linear expansivity between the ceramic board 1310 and the holder 1400 can be predicted, and the precision of alignment of the scanning light improves.

In the present embodiment, as illustrated in FIG. 17, the ceramic board 1310 has a first plane 1312, and the holder 1400 has a second plane 1410 that faces and contacts the first plane 1312. The holder 1400 is allowed to expand in a direction parallel to the second plane 1410 in contrast with the ceramic board 1310.

Due to such a configuration, the size of the ceramic board 1310 may change in contrast with the holder 1400 in a direction parallel to the second plane 1410 due to the difference in linear expansivity between the ceramic board 1310 and the holder 1400, and the direction in which the relative positions of the ceramic board 1310 and the holder 1400 change in a direction parallel to the second plane 1410 can be predicted. In other words, the direction in which the scanning light of the light deflector 13 is shifted in a direction parallel to the second plane 1410 due to the difference in linear expansivity between the ceramic board 1310 and the holder 1400 can be predicted, and the precision of alignment of the scanning light improves.

Figure 20:
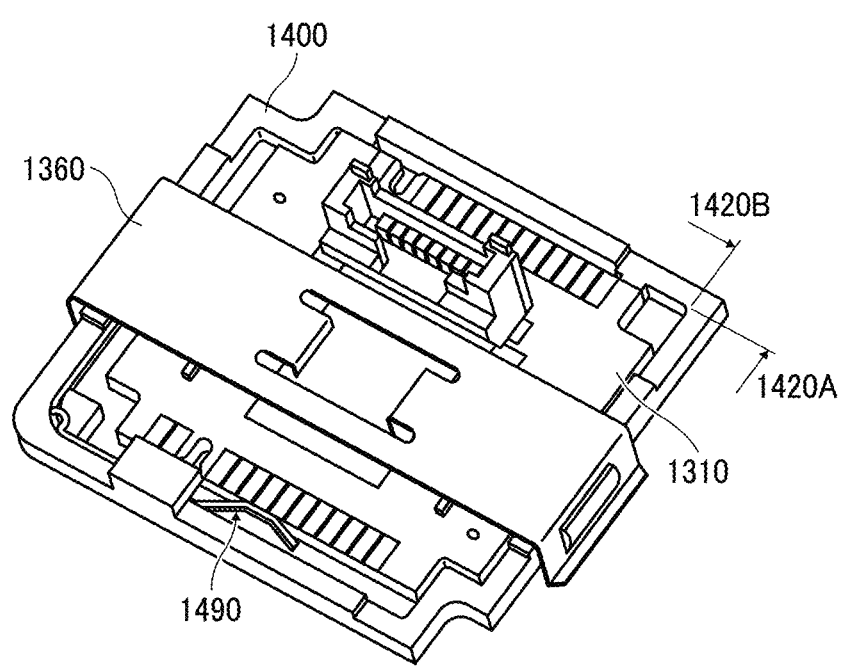
FIG. 20 is a perspective view of an optical scanner according to a first modification of the embodiment of the present disclosure as illustrated in FIG. 18.

FIG. 20 is a perspective view of an optical scanner, which corresponds to the light deflector 13, according to a first modification of the embodiment of the present disclosure as illustrated in FIG. 18.

The holder 1400 has a third planes 1420A and 1420B orthogonal to the second plane 1410, and is provided with a U-shaped second blade spring 1490 that corresponds to another pressurizing member configured to apply pressure to the ceramic board 1310 against the third planes 1420A and 1420B in a direction parallel to the second plane 1410.

Due to such a configuration, the movement of the ceramic board 1310 is restricted in an direction perpendicular to each one of the third planes 1420A and 1420B with reference to the holder 1400, and the ceramic board 1310 is fixed to the holder 1400. In this configuration according to the first modification of the embodiment of the present disclosure, the point of intersection of the third planes 1420A and 1420B serves as the fixed point.

Moreover, in this configuration according to the first modification of the embodiment of the present disclosure, the second blade spring 1490 deforms in an direction perpendicular to each one of the third planes 1420A and 1420B. As a result, the holder 1400 is allowed to expand in contrast with the ceramic board 1310 due to the difference in linear expansivity between the holder 1400 and the ceramic board 1310.

Figure 21:
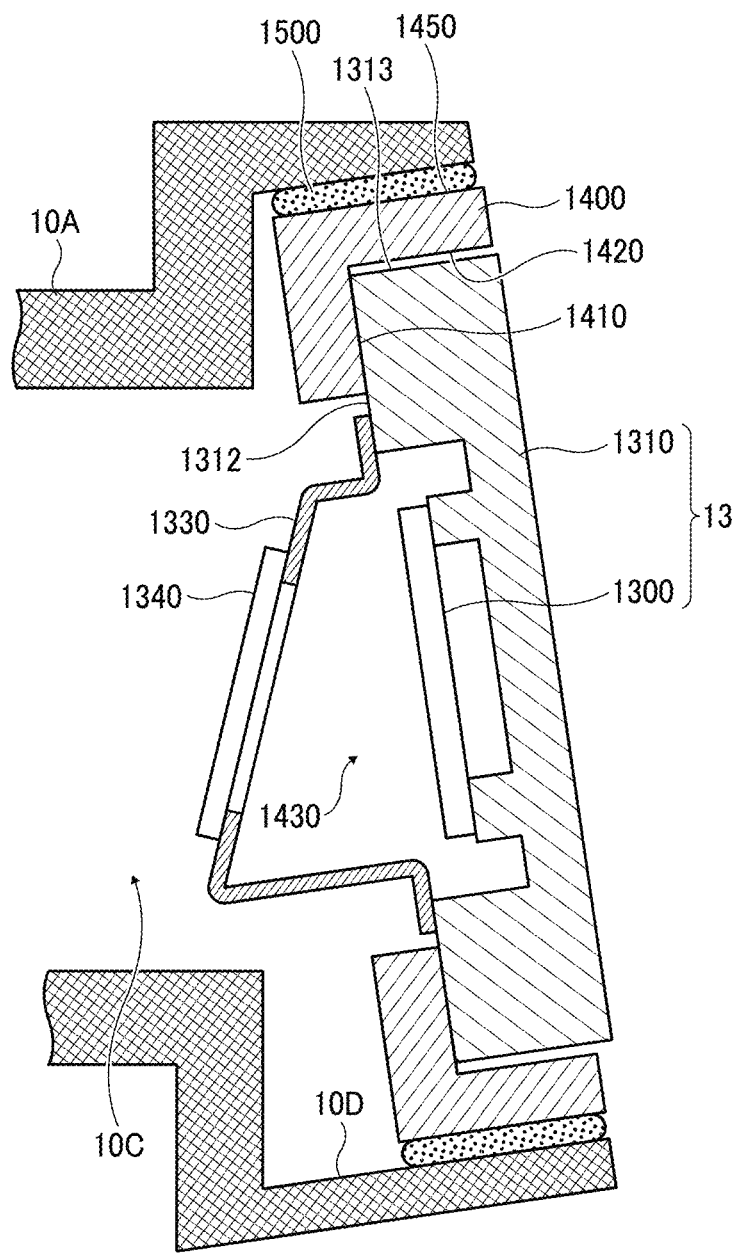
FIG. 21 is a sectional view of the optical scanner according to the first modification of the above embodiment of the present disclosure, illustrating how the optical scanner is installed.

FIG. 21 is a sectional view of the optical scanner, i.e., the light deflector 13, according to the first modification of the above embodiment of the present disclosure, illustrating how the optical scanner is installed.

In the present embodiment as illustrated in FIG. 17, the facing plane 1440 of the holder 1400 is bonded to the outer end face 10B of the housing 10A by the adhesive 1500. By contrast, in the first modification of the above embodiment of the preset disclosure as illustrated in FIG. 21, an outer surface 1450 of the holder 1400 is bonded to an inner surface 10D of the housing 10A by the adhesive 1500.

Figure 22:
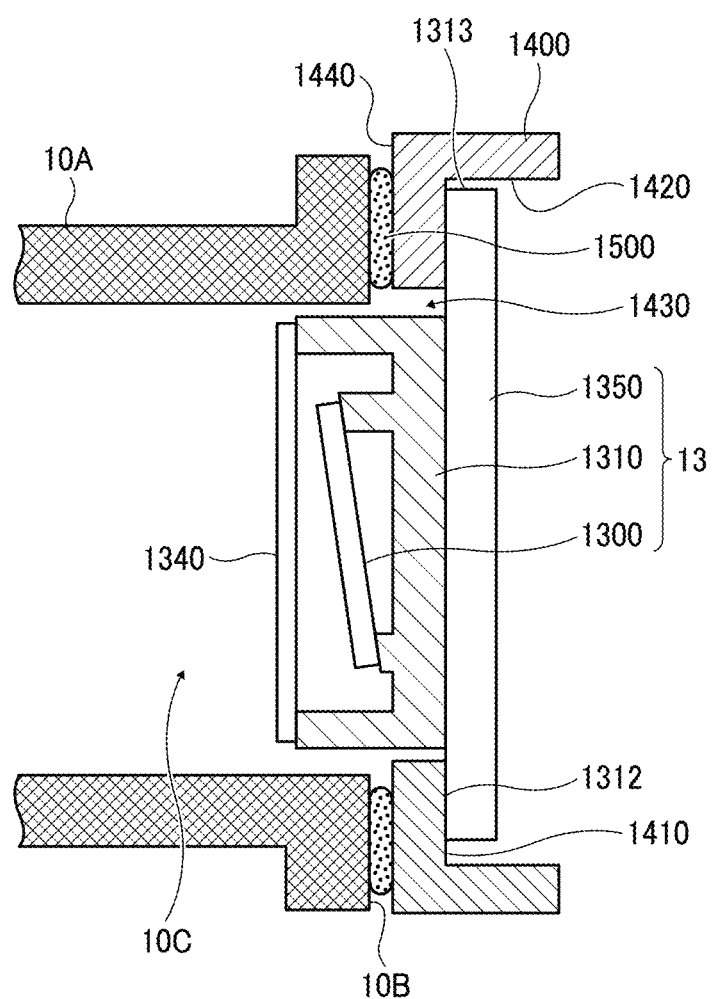
FIG. 22 is a sectional view of an optical scanner according to a second modification of the above embodiment of the present disclosure, illustrating how the optical scanner is installed.

FIG. 22 is a sectional view of the optical scanner, i.e., the light deflector 13, according to a second modification of the above embodiment of the present disclosure, illustrating how the optical scanner is installed.

In the above embodiment of the present disclosure as described above with reference to FIG. 17, the ceramic board 1310 has the first plane 1312 that faces and contacts the second plane 1410 of the holder 1400. By contrast, in the second modification of the above embodiment of the present disclosure as illustrated in FIG. 22, the printed circuit board 1350 to which the ceramic board 1310 is attached has the first plane 1312 that faces and contacts the second plane 1410 of the holder 1400.

In the above embodiment of the present disclosure as described above with reference to FIG. 17, the mirror surface of the optical scanning chip 1300 is parallel to the bottom face of the ceramic board 1310. By contrast, in the second modification of the above embodiment of the present disclosure as illustrated in FIG. 22, the mirror surface of the optical scanning chip 1300 is inclined with respect to the bottom of the ceramic board 1310. In both the configuration according to the above embodiment of the present disclosure and the configuration according to the second modification of the above embodiment of the present disclosure, the bottom face of the ceramic board 1310 serves as the base line for the implementation of the optical scanning chip 1300, and the angle of the normal line to the mirror surface of the optical scanning chip 1300 is determined by the bottom face of the ceramic board 1310.

Figure 23:
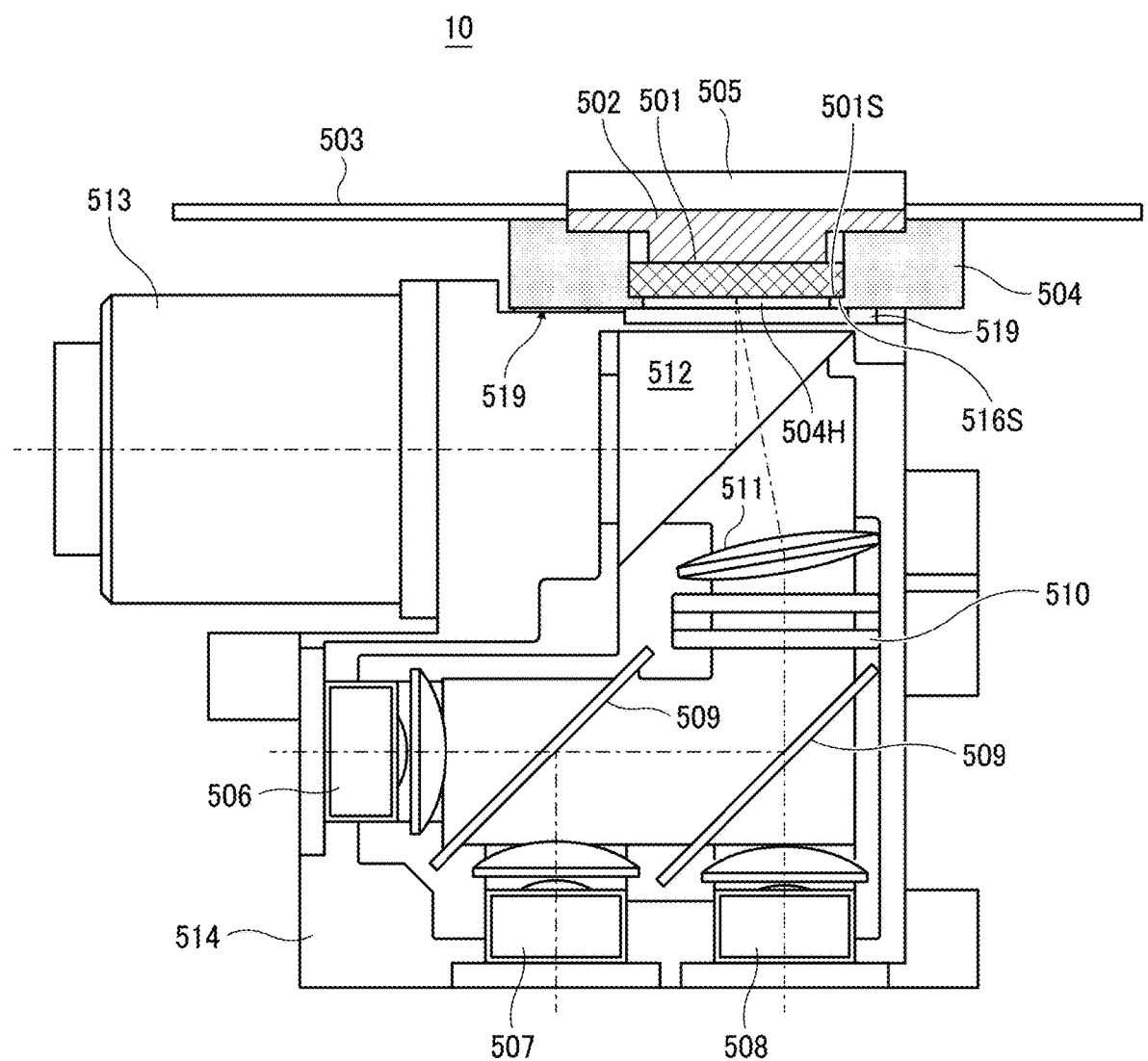
FIG. 23 is a sectional view of a reflector according to a third modification of the above embodiment of the present disclosure, illustrating how the reflector is installed.

FIG. 23 is a sectional view of a reflector, which corresponds to an optical modulation element 501, according to a third modification of the above embodiment of the present disclosure, illustrating how the reflector is installed.

The display device 10 according to the third modification of the above embodiment of the present disclosure is a front-projecting projector that includes an optical modulation element 501, and projects an image onto a screen.

The optical modulation element 501 is an example of the reflector, and a device that controls the projection of light for each one of the pixels to be displayed such as a digital micromirror device (DMD) where a plurality of micromirrors whose number corresponds to the number of pixels are arranged in a matrix, and a liquid crystal on silicon (LCOS) where a plurality of reflective liquid crystal elements are arranged in a matrix may be used.

The optical modulation element 501 is accommodated in a package made of ceramics so as to be protected from humidity, and its opening on the top face is hermetically sealed by sealing glass.

An example embodiment in which a DMD is used as the optical modulation element 501 is described below. The display device 10 is provided with a light source unit that includes three colored light sources 506, 507, and 508 that correspond to three colors of red (R), blue (B), and green (G) in a one-to-one relationship, and a pair of dichroic mirrors 509 where the wavelengths of the light to be reflected and the wavelengths of the light to be transmitted are determined in advance.

Moreover, the display device 10 is provided with a relay optical system that includes first and second fly-eye lenses 510 that are arranged in the order listed from the upstream side of the optical path so as to be separate from each other, and a field lens 511, and the relay optical system guides the irradiation light emitted from light source unit to an optical element 512.

The display device 10 is provided with the optical element 512 that lets the irradiation light that is guided through the relay optical system become incident on the optical modulation element 501 and guides the on-light beam, which is emitted from the optical modulation element 501 to form an image based on the image data, to a projection optical system 513, a projection optical system 513, and a housing 514 that integrally holds the above-described light source unit, the relay optical system, and the optical element 512.

The optical element 512 is configured by a prism that has at least a pair of planes, and the projection optical system 513 projects the light exiting from the optical element 512 onto a screen to form an image. Such a screen is configured by, for example, a microlens array (MLA).

The optical modulation element 501 modulates the incident light based on the image data. The optical modulation element 501 is configured by a digital micromirror device (DMD) that has an approximately rectangular-shaped mirror surface consisting of a plurality of micromirrors, and drives the above multiple micromirrors on a time-division basis based on the input image data. As a result, the light is processed and reflected so as to achieve an image based on the image data.

The display device 10 is provided with a socket 502, a control board 503, a DMD holder 504 made of resin or aluminum die-cast, and a pressurizing member 505.

The optical modulation element 501 is fixed to the socket 502 as the terminal is inserted into the socket 502 mounted on the control board 503.

The DMD holder 504 is an example of a holder, and is attached to the housing 514 so as to hold the optical modulation element 501.

The optical modulation element 501 has a first plane 501S, and the DMD holder 504 has a second plane 516S contacting the first plane 501S. The pressurizing member 505 has a hook at an edge face, and such a hook engages with the DMD holder 504. The pressurizing member 505 applies pressure to the optical modulation element 501 against the DMD holder 504 through the socket 502 such that the first plane 501S contacts the second plane 516S.

Due to such a configuration, a DMD unit is achieved in which the control board 503 is held by the DMD holder 504 in a state where the first plane 501S contacts the second plane 516S with reliability.

In the above embodiment of the present disclosure, the optical modulation element 501 and the DMD holder 504 are arranged such that the first plane 501S will be located further from the housing 514 than the second plane 516S.

The DMD holder 504 has an opening 504H, and the optical modulation element 501 faces the inside of the housing 514 through the opening 54H.

The mounting plane of the housing 514 is arranged opposite to the DMD holder 504 with a gap 519 of about 0.1 mm, which serves as a clearance for adjustment, according to the tilt adjustment in a tilted direction, and the gap 519 is filled with an ultraviolet (UV) curing adhesive and such an adhesive is cured and fixed upon adjusting the alignment of the optical modulation element 501 that is held by the DMD holder 504. In the present embodiment, acrylic-based adhesive or epoxide-based adhesive with relatively high viscosity and a low degree of contraction when cured, which can easily be filled, may be used.

The DMD holder 504 is bonded to the housing 514 by the adhesive that fills the gap 519, and the difference between the linear expansivity of the DMD holder 504 and the linear expansivity of the housing 514 is smaller than the difference between the linear expansivity of the optical modulation element 501 and the linear expansivity of the housing 514.

In the present embodiment, the DMD holder 504 may be made of a material whose coefficient of thermal expansion is equivalent to that of the materials of the housing 514. Due to such selection, no shearing stress is caused to the bonding interface even if the changes in temperature are harsh as in the room of a vehicle. Accordingly, stable adhesive strength can be maintained over time.

Figure 24:
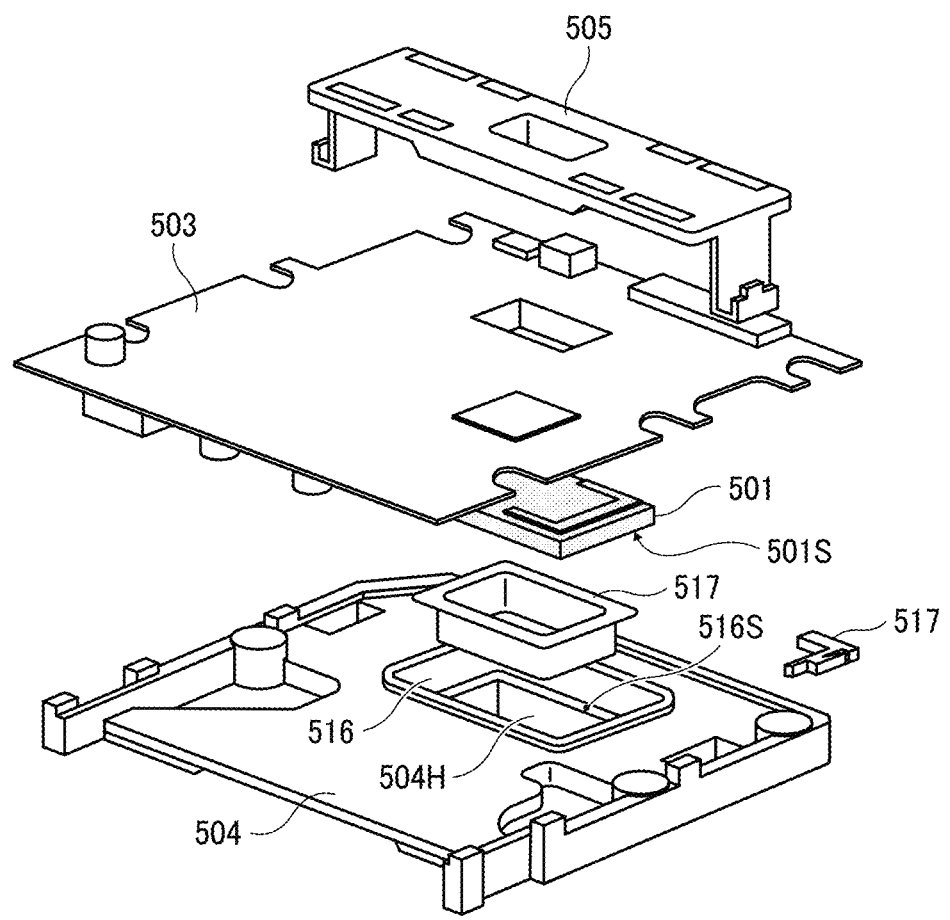
FIG. 24 is an exploded perspective view including the reflector as illustrated in FIG. 23.

FIG. 24 is an exploded perspective view including the reflector as illustrated in FIG. 23.

A concave portion 516 is formed on the DMD holder 504. As illustrated in FIG. 23, the second plane 516S that abuts the first plane 501S of the optical modulation element 501 is formed on the concave portion 516.

A dustproofing rubber 517 is arranged between the optical modulation element 501 and the concave portion 516 of the DMD holder 504. The top face of the package and the exterior walls of the housing 514 face each other, but are separated from each other having a clearance for adjustment therebetween. In order to avoid dust entering through such a clearance, the dustproofing rubber 517 is sandwiched between the optical modulation element 501 and the concave portion 516 of the DMD holder 504 to seal the gap.

Figure 25:
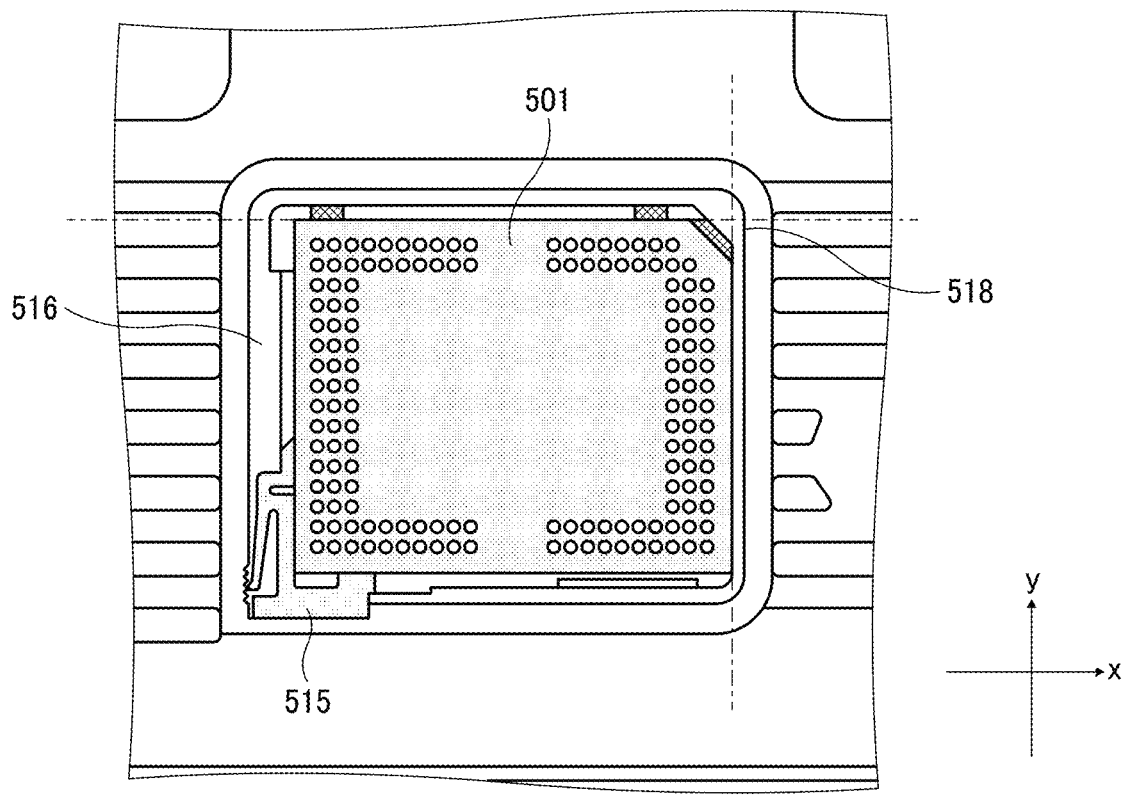
FIG. 25 is a rear view including the reflector as illustrated in FIG. 23.

FIG. 25 is a rear view including the reflector as illustrated in FIG. 23.

As the optical modulation element 501 requires core adjustment with the projection optical system 513, the optical modulation element 501 is fixed upon adjusting the alignment of the DMD unit where the control board 503 is integrally held by the DMD holder 504 with reference to the housing 514 in directions (XY-directions) orthogonal to the direction of the optical axis (Z-direction) and in a direction tilted with reference to the optical axis to determine the relative positions of the optical modulation element 501 and the projection optical system 513.

The DMD holder 504 has a third planes 518 orthogonal to the second plane 516S as illustrated in FIG. 24, and is provided with a pressing member 515 that is an example of another pressurizing member configured to apply pressure to the optical modulation element 501 against the third plane 518 in a direction parallel to the second plane 516S.

More specifically, the pressing member 515 is inserted into the gap between the optical modulation element 501 and the concave portion 516 so as to stretch and put the two sides of the optical modulation element 501 against the two sides of the third plane 518 in the X-direction and the Y-directional.

As the package of the optical modulation element 501 is made of ceramics, the optical modulation element 501 may be displaced due to the difference in thermal expansion with the DMD holder 504. However, the point of intersection of the two sides of the third plane 518 serves as a fixed point and such a fixed point serves as an anchor, and the placement accuracy of the optical modulation element 501 can be maintained by repeated expansion and contraction.

In other words, the DMD holder 504 restricts the movement of the optical modulation element 501, and allows the size of the optical modulation element 501 to change in contrast with the DMD holder 504.

More specifically, the DMD holder 504 allows the size of the optical modulation element 501 to change in a direction parallel to the second plane 516S in contrast with the DMD holder 504.

As described above, embodiments of the present disclosure relate to the structure or mechanisms for holding the optical device, where the optical device is fixed upon adjusting the alignment of an optical device such as the light deflector 13 and the optical modulation element 501, which is implemented on a circuit board made of ceramics or a package, at least triaxially with reference to a light source or a projection optical system that is held by a housing that is formed or molded by a material such as a resin or aluminum die-cast whose expansivity is significantly different from that of ceramics to determine the relative positions of the optical device and the housing. The display device 10 according to the above embodiment of the present disclosure, which serves as an optical scanner and a reflector, is provided with the light deflector 13 provided with the optical scanning chip 1300 that reflects the irradiation light emitted from the light-source device 11 to perform scanning in the main scanning direction and the sub-scanning direction that correspond to a first direction and a second direction perpendicular to the first direction, respectively, or the optical modulation element 501 that is arrayed in the main scanning direction and the sub-scanning direction orthogonal to the main scanning direction. The display device 10 according to the above embodiment of the present disclosure, which serves as an optical scanner and a reflector, is further provided with an optical device such as the optical modulation element 501 that reflects the light emitted from the light source unit to display an image, and the holder 1400 or the DMD holder 504 that holds the ceramic board 1310 or a package or the printed circuit board 1350 on which the optical device is mounted, where the gap that serves as a clearance for adjustment is filled with an adhesive and such an adhesive is cured for fixation upon determining the relative positions of the optical device and the housing. Due to such a configuration, the movement of the optical device with reference to the holder 1400 or the DMD holder 504 can be restricted, and the difference in thermal expansion coefficient between the holder 1400 or the DMD holder 504 and the ceramic board 1310 or a package or the printed circuit board 1350 is allowed. As a result, the load on the adhesion site between the holder 1400 or the DMD holder 504 and the housing can be reduced.

Due to such a configuration, even when the size of each element changes due to the difference in linear expansivity between the ceramic board 1310, the package, or the printed circuit board 1350, and the holder 1400, the size of the ceramic board 1310 or the package or the printed circuit board 1350 may change with reference to an anchor, and the position of the anchor is fixed and unchanged even if expansion and contraction occurs repeatedly. Accordingly, the relative positions of the ceramic board 1310 or a package or the printed circuit board 1350 and the holder 1400 does not change. As a material whose difference in linear expansivity with the housing is small can be selected for the holder 1400, the adhesive strength is secured, and the placement accuracy between the optical device and the light source or the projection optical system that is held in the housing can be maintained with high stability.

Due to this configuration, the displacements of scanning light or reflection light due to the optical device can be reduced regardless of the difference in linear expansivity between the ceramic board 1310, the package, or the printed circuit board 1350, and the housing.

The display device 10 is provided with the light deflector 13 that may also serve as an optical scanner or a reflector and is provided with the optical scanning chip 1300 that reflects the irradiation light emitted from the light-source device 11 to perform scanning in the main scanning direction and the sub-scanning direction that correspond to a first direction and a second direction perpendicular to the first direction, respectively, the housing 10A, and the holder 1400 that is attached to the housing 10A and holds the ceramic board 1310 or the printed circuit board 1350 of the light deflector 13. The holder 1400 restricts the movement of the light deflector 13, and allows the size of the light deflector 13 to change in contrast with the holder 1400.

Due to such a configuration, even when the relative positions of the ceramic board 1310 or the printed circuit board 1350 and the holder 1400 change due to the difference in linear expansivity between the ceramic board 1310 of the light deflector 13 and the holder 1400, the size of the ceramic board 1310 or the printed circuit board 1350 with reference to the holder 1400 may change. As a result, the direction in which the relative positions of the ceramic board 1310 or the printed circuit board 1350 and the holder 1400 change can be predicted.

Moreover, the direction in which the scanning light of the light deflector 13 is shifted due to the difference in linear expansivity between the ceramic board 1310 or the printed circuit board 1350 and the holder 1400 can be predicted, and the precision of alignment of the scanning light or the reflection light improves.

The reflector in the above embodiment of the present disclosure corresponds to the light deflector 13 configured to reflect the irradiation light to perform scanning in the first direction and the second direction orthogonal to the first direction. In such a configuration, the illuminance uniformity on the image area 61 due to the positional displacement between the light deflector 13 and the irradiation light emitted to the light deflector 13 or the color irregularities or mottling among the light sources of red, green, and blue (RGB) colors can be reduced, and an image can be formed at high quality.

The reflector in the above embodiment of the present disclosure is disposed in the first direction and in the second direction orthogonal to the first direction, and corresponds to the optical modulation element 501 configured to reflect the irradiation light. In such a configuration, the illuminance uniformity on the image area 61 due to the positional displacement between the optical modulation element 501 and the irradiation light emitted to the optical modulation element 501 or the distortion on an image due to the positional displacement between the light reflected by the optical modulation element 501 and the projection optical system can be reduced, and an image can be formed at high quality.

As described above, the ceramic board 1310 or the printed circuit board 1350 has the first plane 1312, and the holder 1400 has the second plane 1410 that faces and contacts the first plane 1312, and the size of the ceramic board 1310 or the printed circuit board 1350 in contrast with the holder 1400 may change in a direction parallel to the second plane 1410.

Due to such a configuration, even when the relative positions of the ceramic board 1310 or the printed circuit board 1350 and the holder 1400 change due to the difference in linear expansivity between the ceramic board 1310 or the printed circuit board 1350 and the holder 1400, the size of the ceramic board 1310 or the printed circuit board 1350 in contrast with the holder 1400 may change in a direction parallel to the second plane 1410. Accordingly, the direction in which the relative positions of the ceramic board 1310 or the printed circuit board 1350 and the holder 1400 change in a direction parallel to the second plane 1410 can be predicted. In other words, as expansion and contraction is allowed as desired along the abutment plane, no external force occurs to the light deflector 13 or the optical modulation element 501 due to the difference in linear expansivity, and the posture or attitude of the reflector can be maintained.

Due to this configuration, the direction in which the scanning light of the light deflector 13 is shifted in a direction parallel to the second plane 1410 due to the difference in linear expansivity between the ceramic board 1310 or the printed circuit board 1350 and the holder 1400 can be predicted, and the precision of alignment of the scanning light improves.

The light deflector 13 has the blade spring 1360 that serves as a pressurizing member and applies pressure to the ceramic board 1310 or the printed circuit board 1350 of the light deflector 13 against the holder 1400 such that the first plane 1312 contacts the second plane 1410.

Due to such a configuration, the movement of the light deflector 13 can be controlled in a reliable manner in an direction perpendicular to the first plane 1312 with reference to the holder 1400.

In the above embodiment of the present disclosure, the light deflector 13 and the holder 1400 are arranged such that the first plane 1312 will be located further from the housing 10A than the second plane 1410.

In such a configuration, the first plane 1312 of the ceramic board 1310 or the printed circuit board 1350 abuts the second plane 1410 of the holder 1400 from the outside of the housing 10A. The assembly of such a configuration can be done efficiently compared with cases in which the first plane 1312 of the ceramic board 1310 or the printed circuit board 1350 abuts the second plane 1410 of the holder 1400 from the inside of the housing 10A.

The holder 1400 has the opening 1430, and the light deflector 13 faces the inside of the housing 10A through the opening 1430.

The ceramic board 1310 of the light deflector 13 is fixed to the holder 1400 at the circular hole 1314 that serves as a fixed point. The ceramic board 1310 or the holder 1400 has the duct 1316, and is provided with the pair of spring pins 1318 that serve as convex portions configured to be slidable through the duct 1316.

Due to such a configuration, the movement of the ceramic board 1310 is restricted with reference to the holder 1400, and the ceramic board 1310 is fixed to the holder 1400. Moreover, the holder 1400 is allowed to expand in contrast with the ceramic board 1310 due to the difference in linear expansivity between the holder 1400 and the ceramic board 1310.

The holder 1400 has the third planes 1420A and 1420B that are orthogonal to the second plane 1410, and is provided with the second blade spring 1490 that corresponds to another pressurizing member configured to apply pressure to the light deflector 13 against the third planes 1420A and 1420B in a direction parallel to the second plane 1410.

Due to such a configuration, the movement of the ceramic board 1310 is restricted with reference to the holder 1400 in an direction perpendicular to each one of the third planes 1420A and 1420B, and the ceramic board 1310 is fixed to the holder 1400. Moreover, the holder 1400 is allowed to expand in contrast with the ceramic board 1310 due to the difference in linear expansivity between the holder 1400 and the ceramic board 1310.

The holder 1400 is bonded to the housing 10A, and the difference between the linear expansivity of the holder 1400 and the linear expansivity of the housing 10A is smaller than the difference between the linear expansivity of the ceramic board 1310 of the light deflector 13 and the linear expansivity of the housing 10A.

Due to such a configuration, the shearing stress that is applied to the adhesive 1500 due to the difference in linear expansivity can be reduced compared with cases in which the ceramic board 1310 is directly bonded to the housing 10A.

The mobile object 1A according to an embodiment of the present disclosure is provided with the display device 10 as described above that serves as an optical scanner and a reflector, and is further provided with the front windshield 50 that reflects the irradiation light diverged and projected through the screen 15, and the free-form surface mirror 30 that serves as an imaging optical system and projects the irradiation light projected from the screen 15 toward the front windshield 50.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

The display device according to an embodiment of the present disclosure is applicable not only to a heads-up display (HUD) but also to, for example, a head-mounted display, a prompter, and a projector. For example, when a display device according to an embodiment of the present disclosure is applied to a projection device, such a projection device can be configured in a similar manner to the display device 10. In other words, the display device 10 may project the image light onto, for example, a projection screen or a wall through the free-form surface mirror 30. The display device 10 may project the image light that has passed through the screen 15 onto, for example, a projection screen or a wall, without involving the free-form surface mirror 30.

What is claimed is:

1. A light reflection device comprising:
   a light source to emit irradiation light;
   a reflector to reflect the irradiation light emitted from the light source;
   a housing; and
   a holder attached to the housing to hold the reflector,
   wherein the reflector has a first plane,
   the holder restricts a movement of the reflector,
   the holder has a second plane contacting the first plane, and allows a size of the reflector to change in a direction parallel to the second plane in contrast with the holder, and
   the reflector and the holder are disposed such that the first plane is located further from the housing than the second plane in a direction perpendicular to the first plane and the second plane.

2. The light reflection device according to claim 1, wherein the reflector is a light deflector to reflect the irradiation light to perform scanning in a first direction and a second direction orthogonal to the first direction.

3. The light reflection device according to claim 1, wherein the reflector is disposed in a first direction and in a second direction orthogonal to the first direction, and is an optical modulation element to reflect the irradiation light.

4. The light reflection device according to claim 1, further comprising
a pressurizing member to apply pressure to the reflector against the holder such that the first plane contacts the second plane.

5. The light reflection device according to claim 1,
wherein the holder has an opening, and
wherein the reflector faces an inside of the housing through the opening.

6. The light reflection device according to claim 1,
wherein the reflector is fixed to the holder at a fixed point, and
wherein the reflector or the holder has a duct and a convex portion to be slidable through the duct.

7. The light reflection device according to claim 1,
wherein the holder has a third plane orthogonal to the second plane and another pressurizing member to apply pressure to the reflector against the third plane in a direction parallel to the second plane.

8. The light reflection device according to claim 1,
wherein the holder is bonded to the housing.

9. The light reflection device according to claim 1,
wherein a difference between a linear expansivity of the holder and a linear expansivity of the housing is smaller than a difference between a linear expansivity of the reflector and the linear expansivity of the housing.

10. The light reflection device according to claim 1, further comprising
a screen on which an image is formed by the irradiation light reflected by the reflector.

11. A mobile object comprising:
a light reflection device including
a light source to emit irradiation light,
a reflector to reflect the irradiation light emitted from the light source, the reflector having a first plane,
a housing; and
a holder attached to the housing to hold the reflector,
a screen on which an image is formed by the irradiation light reflected by the reflector;
a front windshield to reflect the irradiation light diverged and projected through the screen; and
an imaging optical system to project the irradiation light emitted from the screen toward the front windshield,
wherein the holder has a second plane contacting the first plane, the holder restricts a movement of the reflector and allows a size of the reflector to change in contrast with the holder,
the reflector and the holder are disposed such that the first plane is located further from the housing than the second plane in a direction perpendicular to the first plane and the second plane, and
a difference between a linear expansivity of the holder and a linear expansivity of the housing is smaller than a difference between a linear expansivity of the reflector and the linear expansivity of the housing.

12. A light reflection device comprising:
a light source to emit irradiation light;
a reflector to reflect the irradiation light emitted from the light source;
a housing; and
a holder attached to the housing to hold the reflector, the reflector having a first plane,
wherein the holder has a second plane contacting the first plane, the holder restricts a movement of the reflector and allows a size of the reflector to change in contrast with the holder,
the reflector and the holder are disposed such that the first plane is located further from the housing than the second plane in a direction perpendicular to the first plane and the second plane, and
a difference between a linear expansivity of the holder and a linear expansivity of the housing is smaller than a difference between a linear expansivity of the reflector and the linear expansivity of the housing.

13. The light reflection device according to claim 12,
wherein the reflector is a light deflector to reflect the irradiation light to perform scanning in a first direction and a second direction orthogonal to the first direction.

14. The light reflection device according to claim 12,
wherein the reflector is disposed in a first direction and in a second direction orthogonal to the first direction, and is an optical modulation element to reflect the irradiation light.

15. The light reflection device according to claim 12,
wherein the reflector has a first plane, and
wherein the holder has a second plane contacting the first plane, and allows a size of the reflector to change in a direction parallel to the second plane in contrast with the holder.

16. The light reflection device according to claim 15, further comprising
a pressurizing member to apply pressure to the reflector against the holder such that the first plane contacts the second plane.

17. The light reflection device according to claim 15,
wherein the reflector and the holder are disposed such that the first plane is located further from the housing than the second plane.

18. The light reflection device according to claim 17,
wherein the holder has an opening, and
wherein the reflector faces an inside of the housing through the opening.

19. The light reflection device according to claim 15,
wherein the holder has a third plane orthogonal to the second plane and another pressurizing member to apply pressure to the reflector against the third plane in a direction parallel to the second plane.

20. The light reflection device according to claim 12,
wherein the reflector is fixed to the holder at a fixed point, and
wherein the reflector or the holder has a duct and a convex portion to be slidable through the duct.

* * * * *